(12) United States Patent
Mix et al.

(10) Patent No.: US 12,404,210 B2
(45) Date of Patent: Sep. 2, 2025

(54) BOND PRODUCED WITH AN AT LEAST PARTIALLY CRYSTALLIZED GLASS, SUCH AS A METAL-TO-GLASS BOND, IN PARTICULAR A METAL-TO-GLASS BOND IN A FEED-THROUGH ELEMENT OR CONNECTING ELEMENT, AND METHOD FOR PRODUCING SUCH A BOND, IN PARTICULAR IN A FEED-THROUGH ELEMENT OR CONNECTING ELEMENT

(71) Applicant: Schott AG, Mainz (DE)

(72) Inventors: Christian Mix, Landshut (DE); Ina Mitra, Stadecken-Elsheim (DE); Ulf Dahlmann, Landshut (DE); Jens Suffner, Landshut (DE); Martun Hovhannisyan, Frankfurt am Main (DE); Björn Ramdohr, Landshut (DE)

(73) Assignee: Schott AG, Mainz (DE)

( * ) Notice: Subject to any disclaimer, the term of this patent is extended or adjusted under 35 U.S.C. 154(b) by 28 days.

(21) Appl. No.: 18/499,631

(22) Filed: Nov. 1, 2023

(65) Prior Publication Data
US 2024/0059606 A1 Feb. 22, 2024

Related U.S. Application Data

(60) Division of application No. 16/230,523, filed on Dec. 21, 2018, now Pat. No. 11,840,479, which is a (Continued)

(30) Foreign Application Priority Data

Jun. 21, 2016 (DE) .................... 10 2016 111 390.5

(51) Int. Cl.
C03C 27/02 (2006.01)
B32B 5/14 (2006.01)
(Continued)

(52) U.S. Cl.
CPC .............. *C03C 27/02* (2013.01); *B32B 5/145* (2013.01); *B32B 17/06* (2013.01); *C03B 19/06* (2013.01);
(Continued)

(58) Field of Classification Search
None
See application file for complete search history.

(56) References Cited

U.S. PATENT DOCUMENTS 3,825,468 A 7/1974 Wojcik et al.
5,071,794 A 12/1991 Shaikh
(Continued)

FOREIGN PATENT DOCUMENTS

DE 100 16 416 A1 10/2001
DE 10 2006 027 307 A1 12/2007
(Continued)

OTHER PUBLICATIONS

Bretcanu et al., Sintering and crystallisation of 45S5 Bioglass® powder, Journal of the European Ceramic Society, 29 (2009) pp. 3299-3306 (Year: 2009).*
(Continued)

*Primary Examiner* — Elizabeth Collister
(74) *Attorney, Agent, or Firm* — TAYLOR & EDELSTEIN, PC

(57) ABSTRACT

An at least partially crystallized glass includes at least one crystal phase and pores which are distributed in the at least partially crystallized glass in a structured manner.

20 Claims, 7 Drawing Sheets

Related U.S. Application Data continuation of application No. PCT/EP2017/065321, filed on Jun. 21, 2017.

(51) Int. Cl.

| | |
|---|---|
| *B32B 17/06* | (2006.01) |
| *C03B 19/06* | (2006.01) |
| *C03C 3/064* | (2006.01) |
| *C03C 3/087* | (2006.01) |
| *C03C 3/093* | (2006.01) |
| *C03C 10/00* | (2006.01) |
| *C03C 27/00* | (2006.01) |
| *C03C 27/04* | (2006.01) |
| *C04B 37/04* | (2006.01) |

(52) U.S. Cl.
CPC ............. *C03C 3/064* (2013.01); *C03C 3/087* (2013.01); *C03C 3/093* (2013.01); *C03C 10/0036* (2013.01); *C03C 10/0045* (2013.01); *C03C 10/0054* (2013.01); *C03C 27/00* (2013.01); *C03C 27/044* (2013.01); *C04B 37/042* (2013.01); *B32B 17/061* (2013.01); *C04B 2237/343* (2013.01); *C04B 2237/348* (2013.01)

(56) References Cited

U.S. PATENT DOCUMENTS

| | | | |
|---|---|---|---|
| 5,820,989 | A | 10/1998 | Reed et al. |
| 7,674,735 | B2 | 3/2010 | Badding et al. |
| 8,067,326 | B2 | 11/2011 | Godard et al. |
| 8,920,878 | B2 | 12/2014 | Werdecker et al. |
| 8,999,870 | B2 | 4/2015 | Goedeke et al. |
| 9,208,929 | B2 | 12/2015 | Leedecke et al. |
| 2008/0090715 | A1 | 4/2008 | Badding et al. |
| 2014/0293114 | A1 | 10/2014 | Koketsu et al. |
| 2014/0320728 | A1 | 10/2014 | Sugiyama et al. |
| 2014/0356046 | A1 | 12/2014 | Suffner |
| 2014/0360729 | A1 | 12/2014 | Benestad |
| 2020/0027715 | A1 | 1/2020 | Hettler |

FOREIGN PATENT DOCUMENTS

| | | |
|---|---|---|
| DE | 10 2012 206 266 B3 | 7/2013 |
| DE | 10 2014 218 983 A1 | 3/2015 |
| JP | 62-87467 A | 4/1987 |
| JP | 02175629 A | 7/1990 |
| JP | 2011-033715 A | 2/2011 |
| JP | 2014-047123 A | 3/2014 |

OTHER PUBLICATIONS

Notice of Transmission of the International Research Report and the Written Notice Issued the International Searching Authority or Declaration dated Sep. 20, 2017 for International Application No. PCT/EP2017/065321 (15 pages).

International Preliminary Report on Patentability dated Sep. 19, 2018 for International Application No. PCT/EP2017/065321 (33 pages).

I.W. Donald, "Preparation, properties and chemistry of glass- and glass-ceramic-to-metal seals and coatings", Journal of Materials Science, Bd. 28, Nr. 11, Jun. 1, 1993, pp. 2841-2886 (46 pages).

I.W. Donald et al., "Recent developments in the preparation, characterization and applications of glass- and glass-ceramic-to-metal seals and coatings", Journal of Materials Science, Bd. 46, Nr. 7. Apr. 1, 2011, p. 1975-2000 (26 pages).

Oana Bretcanu et al., "Simple methods to fabricate Bioglass-derived glass-ceramic scaffolds exhibiting porosity gradient", Journal of Materials Science, Bd. 43, Nr. 12, Apr. 3, 2018 (8 pages).

Staff et al., Fabrication of a Glass-Ceramic-to-Metal Seal Between Ti—6Al—4V and a Strontium Boroaluminate Glass, International Journal of Applied Ceramic Technology, vol. 13, Issue 5 pp. 956-965, First published: Jun. 16, 2016 (Year: 2016).

* cited by examiner

BOND PRODUCED WITH AN AT LEAST PARTIALLY CRYSTALLIZED GLASS, SUCH AS A METAL-TO-GLASS BOND, IN PARTICULAR A METAL-TO-GLASS BOND IN A FEED-THROUGH ELEMENT OR CONNECTING ELEMENT, AND METHOD FOR PRODUCING SUCH A BOND, IN PARTICULAR IN A FEED-THROUGH ELEMENT OR CONNECTING ELEMENT

CROSS REFERENCE TO RELATED APPLICATIONS

This is a division of U.S. patent application Ser. No. 16/230,523, entitled "BOND PRODUCED WITH AN AT LEAST PARTIALLY CRYSTALLIZED GLASS, SUCH AS A METAL-TO-GLASS BOND, IN PARTICULAR A METAL-TO-GLASS BOND IN A FEED-THROUGH ELEMENT OR CONNECTING ELEMENT, AND METHOD FOR PRODUCING SUCH A BOND, IN PARTICULAR IN A FEED-THROUGH ELEMENT OR CONNECTING ELEMENT", filed on Dec. 21, 2018, which is incorporated herein by reference. U.S. patent application Ser. No. 16/230,523 is a continuation of PCT application No. PCT/EP2017/065321, entitled "BOND PRODUCED WITH AN AT LEAST PARTIALLY CRYSTALLIZED GLASS, SUCH AS A METAL-TO-GLASS BOND, IN PARTICULAR A METAL-TO-GLASS BOND IN A FEED-THROUGH ELEMENT OR CONNECTING ELEMENT, AND METHOD FOR PRODUCING SUCH A BOND, IN PARTICULAR IN A FEED-THROUGH ELEMENT OR CONNECTING ELEMENT", filed Jun. 21, 2017, which is incorporated herein by reference.

FIELD OF THE INVENTION

The present disclosure relates to a bond produced with an at least partially crystallized glass, for example a metal-to-glass bond, which may be a metal-to-glass bond in a feed-through element or connecting element, and also relates to a method for producing such a bond, for example in a feed-through element or connecting element.

BACKGROUND OF THE INVENTION

For manufacturing feed-throughs for electrical conductors it is known to arrange ceramic material, for example, within metallic support structures, which ceramic material holds the conductors.

DE 100 16 416 A1 discloses a spark plug and a method for producing same, in which a center stud is surrounded by an insulator and a glass ceramic burn-off resistor. The glass ceramic burn off resistor in the form of a fused resistor is joined to adjacent metallic components of the spark plug by a glass ceramic solder.

U.S. Pat. No. 5,820,989 describes a glass ceramic composition for hermetic seals to metals, which are used for gas sensors, for example. The glass ceramic materials used have an $SiO_2$ content of more than 65 wt % and furthermore include alkalis, which usually leads to a high glassy content of the glass ceramic material and only limited usability as an insulating material at high temperatures.

U.S. Patent Application Publication No. 2014/0360729 describes a feed-through for a subsea device, in which a glass or glass ceramic material is used to hold an electrical supply line to a motor device tightly so as to resist environmental influences.

DE 10 2014 218 983 A1 describes a feed-through element for harsh operating conditions, which comprises an electrically insulating fixing material which may be a crystallizable glass. Glass, as stated in this application, is known to be an amorphous material in which crystallites are undesirable. However, it is also explicitly stated in this application that an amorphous glass material is just as well suited as a glass ceramic material, and operating temperature ranges specified therein are 260° C. and 350° C. Pores or porosities of the crystallizable glass are not disclosed in this document.

DE 10 2012 206 266 B3 describes a glassy or glass ceramic joining material which is free of barium and strontium, and its use. Pores are not mentioned as being present in this material, neither are pores arranged in a structured manner.

U.S. Pat. No. 3,825,468 B discloses a sintered glass ceramic which may have pores remaining after the sintering process, and a method for producing same. This sintered glass ceramic includes crystals of different melting points, and during sintering temperatures are employed at which the crystals near the surface melt partially, which aims to achieve a closed porosity. However, the basic crystalline structure of the sintered ceramic body is intended to be retained in this temperature treatment. As a result, a partially molten sintered body is obtained with pores which originate from the sintering process itself. However, what is achieved here is partial melting of the glassy phase of crystalline grain boundaries, which is typical for sintered bodies and which does not exhibit the mechanical stability of a completely fused glassy phase in the sintered composite. Furthermore, for the formation of the ceramic phases, first a nucleation temperature is employed in a two-stage thermal process, which causes crystallization nuclei to be formed, and subsequently crystal growth based on these crystallization nuclei is induced at an elevated temperature.

DE 10 2006 027 307 A1 discloses a sintered ceramic and a method for producing same. Pores or porosities are not disclosed for this sintered glass ceramic.

For many applications, for example in harsh environments or in an environment with high pressure and temperature loads, mechanical strength is of great importance, for example to prevent as reliably as possible a rupture of the joining material. Furthermore, there are applications in which the temperature resistance of a bond is crucial, in particular of a ceramic or a metal-to-glass bond. Depending on the intended application, temperatures may occur which require a temperature resistance of more than 1000° C. and in many cases even up to 1200° C. or higher.

SUMMARY OF THE INVENTION

Exemplary embodiments disclosed herein provide crystallizable or crystallized glasses with improved mechanical and thermal properties, bonds between such glasses and enclosure material, for example in the form of metal-to-glass bonds, and feed-throughs, for example of feed-throughs comprising metal-to-glass bonds.

It has been found, highly surprisingly, that mechanical properties, such as breaking and bending strength, can be improved in partially crystallized glasses if pores exist therein.

In some exemplary embodiments, a bond of an at least partially crystallized glass with at least one joining partner is provided with an interface between the at least partially crystallized glass and the at least one joining partner. The at least partially crystallized glass has a porosity that decreases towards the interface between the at least partially crystallized glass and the at least one joining partner.

The following description of the at least partially crystallized glass applies both to the at least partially crystallized glass alone, in terms of its properties, as well as to the at least partially crystallized glass as part of a bond with a joining partner or as part of a feed-through element or connecting element, because the properties of the at least partially crystallized glass have proved to be particularly useful, for example, as part of the bond or of a connecting element or feed-through element.

The pores are distributed in the at least partially crystallized glass in a structured manner. If the pores of the at least partially crystallized glass were not already completely created or existing in the sintered body, but rather a majority thereof arises simultaneously with or during the crystallization, as is the case in some embodiments disclosed herein, complete or almost complete fusing of the glassy phase may be given, which results in a more homogeneous and firmer configuration of the composite of glassy phase and later crystallizing and subsequently crystallized fractions, which are superior in particular to sintered glass ceramics in terms of strength, such as compressive strength. The expression "pores created or existing in the sintered compact" and also the expression "pores created or existing in a sintered body" in the context of the present disclosure both refer to pores that are being formed during sintering, arising due to the mechanical process of compressing the sintered compact or sintered body, but not due to a crystallization. In the presently disclosed method, a more homogeneous distribution of the pores is achieved, and this more homogeneous distribution results in a further improved mechanical resistance and in a further increased thermal shock resistance.

Some exemplary embodiments of the at least partially crystallizable glasses disclosed herein also do not have to be subjected to a two-stage thermal process comprising a nucleation phase and a phase of crystal growth at elevated temperature, since they can be converted into glass ceramic material or ceramic material already in a one-stage thermal process, as so-called self-crystallizing glasses. In this case, temperature may be increased steadily, for example, with a defined, almost constant heating rate. Such temperature-time profiles also offer process engineering advantages, since they are easier to control and can be employed with larger thermal tolerances.

In contrast to a crystallization caused by added crystallization seeds, such as extraneous powder, or bulk crystallization, the disclosed self-crystallizing glasses crystallization nucleates on the surface of the powder of the partially crystallizable glass. This occurs in the self-crystallizing glasses at the heating rates mentioned, without further holding time. This enables effective production. This nucleation occurs with a time offset and at lower temperatures than the actual crystallization process. The wetting of the joining partner, which is required for a hermetic glass seal, occurs after the nucleation, but prior to the actual crystallization process. As a result, a hermetic high-temperature stable glass seal can be achieved.

At first glance, it appears that a weakening of a glass ceramic compound due to reduced material in the pores would occur, but very good mechanical strength values are nevertheless obtained. This is all the more surprising, as in the prior art particularly bubble-free bonding materials are sought in order to achieve high mechanical and thermal stability.

It has been found that the porosity according to the present disclosure essentially contributes to the mechanical thermal shock resistance. There is a gradient in pore density towards the interface of the glass-sealed material, which ensures defect-free and bubble-free wetting. The combination of porosity distribution and homogeneous crystallization leads to a very high mechanical resistance at temperatures of up to 900° C. or, in some embodiments such as a second embodiment, even at temperatures of up to 1200° C. or even more than 1200° C., such as up to a temperature of 1270° C.

The porosity occurs in a structured manner in the at least partially crystallized glass, such as in the form of a controlled porosity. A controlled porosity is distinguished by the fact, here, that the porosity, in particular the pores, do not exist in the same form throughout the volume of the relevant shaped body, which is a shaped sintered body or shaped sintered compact. Controlled porosity in the sense of the present disclosure is given when the porosity assumes a very low value of, for example, not more than 3% in a boundary region of the shaped body. The surface of the at least partially crystallized glass that exhibits a controlled porosity has substantially no open pores, i.e. pores which open towards the medium surrounding the interface, for example air, which still further promotes the high hermeticity or fluid tightness.

Glasses without controlled porosity, by contrast and which may also be crystallized glasses, for example, do not have the pores distributed in a structured manner; rather, they are distinguished by pores at the interface as well, such as open pores. This is because, at high glass sealing temperatures, the glass usually has a very low viscosity, so that pores created or existing in the sintered body, which is also referred to as a "sintered compact," are able to migrate to the interface of the sintered body, where they will then open.

In the case of the controlled porosity in the sense of the present disclosure, by contrast, it is especially the boundary region which is distinguished by a very low porosity. A porosity gradient is existing, within which the porosity from a very low value of, for example, at most 3% to a maximum value which may be 20%, for example, but also more, such as up to 50% or more. In the case of the controlled porosity, this gradient is moreover adjustable, as is the thickness of the boundary region that is distinguished by a very low porosity. Here, the thickness of the region of low porosity will be greater in case of a higher temperature during thermal treatment than in case of a lower temperature, so that this region can be selectively influenced or adjusted. However, the gradient within which the porosity increases from a low value to a maximum value has a smaller dimension in case of a higher temperature than in case of a lower temperature, so that this gradient can also be selectively influenced or adjusted.

A controlled porosity and a gradient of porosity can be achieved when the actual density of the sintered body or sintered compact is lower by, at most, 10%, such as by not more than 5% than a theoretical density of the glass or of the at least partially crystallizing (but not yet crystallized) glass. In this case, the degree of sintering is at least 90%, such as at least 95%. In this case, the pores introduced by the sintered compact or sintered body are usually of small number and may often even emerge from the crystallizable or at least partially crystallized glass, so that the pores which are being formed during the crystallization are responsible for the creation of a structured arrangement of these pores. For a sintering degree of about 99%, the ratio of the pores already created or existing in the sintered body, sintered compact or shaped body relative to the pores formed according to the present disclosure is, for example, about at least 1.8 in some of the embodiments described herein, or may even be higher. This means that for each pore remaining in the sintered body, for example, at least 1.8 pores will be formed, which will then additionally be present in the at least partially crystallized glass. This value is an extremely cautious indication, since it neglects that pores which were already present in the sintered body, sintered compact or shaped body may escape even during the thermal treatment. In addition thereto, the pores which are arising during or simultaneously with the crystallization will strongly expand and thus further increase the resulting value of porosity to significantly more than this ratio value.

This ratio can be adjusted within a wide range through the maximum sintering temperature and the grinding process, in particular the degree of grinding of the ground glass, such as green glass, and may range from at least 1.5 to about 5, for example.

Surprisingly, it has been found that pores of the at least partially crystallized glass were not already completely created or already existing in the sintered compact or sintered body from which the at least partially crystallized glass was produced, but rather are largely formed during or simultaneously with the crystallization or increase in size so that a volume-related increase in porosity results.

In some embodiments, the crystal content of the at least partially crystallized glass is more than 50 vol %, such as more than 60 vol %. This high crystal phase content additionally contributes to an increase in viscosity and thus leads to an enhanced mechanical stability at high temperatures. Furthermore, the high crystallization and therefore partial interlocking of the crystallites results in a fixed position of the pores and thus significantly provides for the controlled porosity.

Thus, an at least partially crystallized glass provided according to the present disclosure may comprise at least one crystal phase and pores which are distributed in the at least partially crystallized glass in a structured manner, wherein the pores of the at least partially crystallized glass may not already be completely created or not already existing in the sintered body from which the at least partially crystallized glass resulted, but rather form at the same time with or during crystallization.

The terms "sintered body" or "sintered compact" refer to a dimensionally stable sintered body made of the crystallizable glass, which is subsequently suitable and intended to form a bond with a body which may represent an enclosure material or else a sealing element.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE DISCLOSURE

Figure 1:
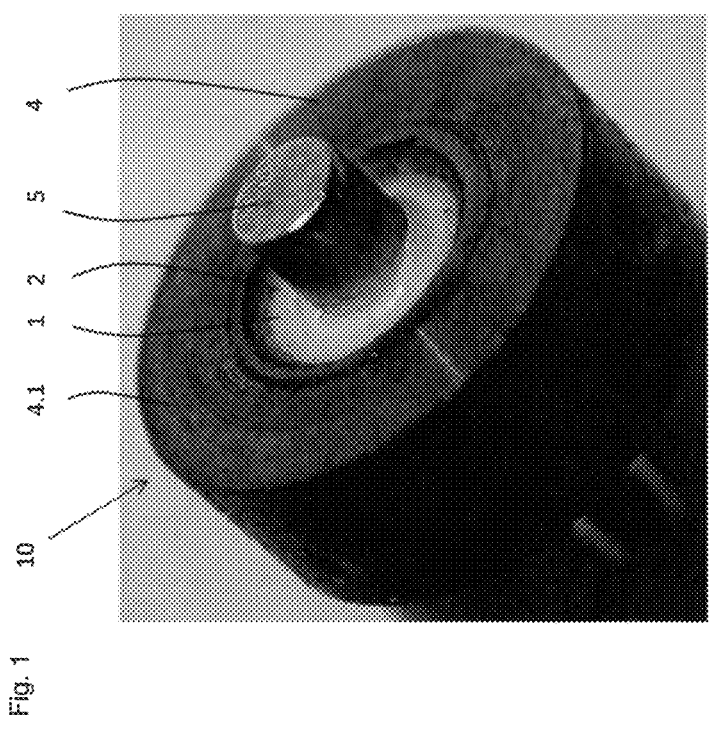
FIG. 1 is a photograph of a feed-through element or connecting element comprising a metal-comprising enclosure and a sintered body arranged therein, in particular as a sintered preform, after temperature treatment thereof, in which the molten sintered body comprises an at least partially crystallizable glass formed according to a second embodiment and has been glass-sealed to the enclosure by the temperature treatment.

For a better understanding, definitions of some of the terms used herein are given further herein.

For the purposes of the present disclosure, a bond between a glass, such as a partially crystallized glass, and an enclosure material, such as a metal, or a high-temperature stable ceramic, is understood to mean a mechanical connection through which the respective enclosure material and the respective glass are joined together at least mechanically, which may be in a fluid-tight manner. To maintain this bond, forces such as those caused by compressive stresses may be present. The term "bond" is not intended to define a chemical bond, although the latter is not excluded by this term in the contact area of the enclosure material to the glass.

An exemplary embodiment of the bond considered here is a glass-to-metal bond. This glass-to-metal bond is generally formed with the at least partially crystallizable glass and a body which may be an enclosure material or a sealing element.

Such bonds, for example metal-to-glass bonds, are referred to as being fluid-tight if this bond seals, i.e., if it is tight against the escape or passage of fluid media, such as substantially completely (hermetically) tight. Tightness can be determined by a leak test, usually using a helium leak tester. Helium leak rates below $1.0 \ast 10^{-8}$ cm$^3$/s (cubic centimeters per second) at room temperature or $1.69 \ast 10^{-10}$ mbar·l/s at room temperature indicate that a substantially completely hermetic seal is provided.

The term "pore" refers to a closed volume element which is completely surrounded by at least partially crystallizable glass and/or at least partially crystallized glass and which, itself, does not include any at least partially crystallizable or at least partially crystallized glass located therein.

As a result of crystallization, an at least partially crystallized glass is formed from the at least partially crystallizable glass, and this at least partially crystallized glass comprises a glassy phase and at least one crystal phase resulting from the crystallizable glass. The glassy phase is also referred to as a "residual glass phase," which may be crystallizable or non-crystallizable.

In this sense, a pore existing in the at least partially crystallized glass may be surrounded at least partially by a residual glass phase and at least partially by a crystal phase, while the pore itself does not include located therein any residual glass phase or crystal phase resulting from the crystallizable glass.

Porosity Φ of the at least partially crystallized glass is considered to be the ratio of the volumes $V_p$ of the pores present in the at least partially crystallizable glass or the at least partially crystallized glass relative to the volume $V_o$ of the at least partially crystallizable glass or at least partially crystallized glass or green glass thereof without pores, so $\Phi = V_p/(V_o + V_p)$. If this value is given in percent, this indication then refers to the percentage volume value of the pores relative to the total volume of the at least partially crystallizable glass or at least partially crystallized glass.

Pores are considered to be distributed in a structured manner when they are not distributed completely homogeneously and when, in particular, local pore density or local porosity is not consistent throughout the entire volume of the at least partially crystallizable glass or at least partially crystallized glass.

In some embodiments, the pores or porosity is distributed such that the porosity exhibits a gradient in the boundary region of the at least partially crystallized glass in such a form that pore density increases from the interface and/or from the surface of the at least partially crystallized glass towards the interior thereof. In terms of its extent, the boundary region may vary between a thickness of at least 5 μm to at most 200 μm, such as between 20 μm and 50 μm.

As far as porosities occurred in prior art joining materials when sintered bodies were used, in particular not highly compacted sintered bodies, such porosities were usually homogeneous and therefore not distributed in a structured manner in the sense of the above definition, in particular not distributed in a controlled structured manner.

Green glass refers to a glass, presently an at least partially crystallizable glass, which is essentially not yet crystallized, i.e., which has a crystal content or proportion of crystal phases of less than 0.1 percent by volume.

In the context of the present disclosure, crystallizable glass is understood to mean a glass which is accessible to crystallization, such as to controllable crystallization or to controlled crystallization, so as to obtain a structure in which a narrow spread may result for the spatial dimension of the crystals or crystallites which can be assigned to the same crystal phase. The crystals or crystallites may have spatial dimensions in a range up to not more than 50 μm. These crystallite sizes which can be assigned to the same crystal phase may deviate from a mean value of crystallite sizes by at most +/−95% from one another.

For the purposes of the present disclosure, the expression "crystals which can be assigned to the same crystal phase" is understood to mean that these crystals crystallize in the same way, i.e., the crystal structure of these crystals is the same in the sense that the lattice constants of these crystals do not differ from each other by more than 20%. Such deviations may result, for example, from local variations in the composition. For example, the crystals may be present as mixed crystals. For example, an at least partially crystallized glass may comprise wollastonite $CaSiO_3$ as a crystal phase, and crystals in which the stoichiometric composition differs from that of pure wollastonite in a sense that further constituents are included, such as yttrium doped $CaSiO_3$, according to a first embodiment, are also assigned to this same crystal phase in the sense of the present disclosure. The expression "same crystal phase" in the sense of the present disclosure therefore includes:

wollastonite: wollastonite crystals and wollastonite-like crystals in the sense that the lattice constants, in particular the spatial dimensions of the unit cell, do not differ by more than 20%;

diopside, $CaMgSi_2O_6$: diopside and diopside-like crystals in the sense that the lattice constants, in particular the spatial dimensions of the unit cell, do not differ by more than 20%;

$ZrO_2$: $ZrO_2$ comprises tetragonal and cubic $ZrO_2$ and in particular also Y-stabilized $ZrO_2$ in tetragonal or cubic modification. $ZrO_2$ may be present in the form of Y-stabilized $ZrO_2$ in tetragonal modification.

In the second embodiment, for example, the crystallizing phases may include Mg stabilized or Ca-stabilized zirconia ($ZrO_2$), enstatite ($MgSiO_3$), forsterite ($Mg_2SiO_4$), calcium zirconium silicates ($Ca_2ZrSi_4O1_2$), anorthite ($CaAl_2Si_2O_8$), and/or diopside ($CaMgSi_2O_6$).

As a result of crystallization, a crystallizable glass becomes an at least partially crystallized glass, i.e., a glass with a proportion of crystal phases of more than 0.1% by volume. Such an at least partially crystallized glass which comprises at least one crystal phase and a glassy phase, for example an at least partially crystallizable glass or a residual glass phase, is also referred to as a glass ceramic in the context of the present disclosure. It is also possible for the glass ceramic to be completely crystallized, in the sense that the crystallized phase comprises more than 99% by volume, for example up to 99.9% by volume. Generally, the residual glass phase or glassy phase in the at least partially crystallized glass may comprise from 0.1 to 99 wt % relative to the total weight of the at least partially crystallizable glass.

In some embodiments, the proportion of the residual glass phase is still high enough so that good wetting of the enclosure materials is ensured. The proportion of the residual glass phase in the at least partially crystallized glass may be at least 5 vol %, such as at least 10 vol %.

The crystallization may proceed in a controlled manner in the sense that a temperature treatment is performed selectively, for example to form a precursor phase for the at least one crystal phase, such as nucleation. But it is also possible that crystallization proceeds in non-controlled manner so as to occur during another processing step, for example in the context of a thermal treatment in which a hermetically tight bond is produced between a material, such as the material of an enclosure, and the at least partially crystallized glass without performing further processing steps for selective crystallization.

In the context of the present disclosure, crystals refer to solids having a three-dimensionally ordered structure. In a partially crystallized glass, the crystals usually have only small sizes of about 0.1 μm up to at most 20 μm. Such small-sized crystals are also called crystallites. Therefore, unless explicitly stated otherwise, the terms crystal and crystallite are used interchangeably in the context of the present disclosure.

Furthermore, the term "feed-through" in the sense of the present disclosure refers to an electrical conductor which is surrounded by an electrically insulating material and fixed in a feed-through opening. In the context of the present disclosure, the terms "feed-through" and "feed-through element" are used interchangeably, unless explicitly stated otherwise.

In the context of the present disclosure, 'bond' is understood to mean a connection between at least two materials, for example the bond of an at least partially crystallized glass to a joining partner.

These two materials may be joined together by a further material. By way of example, such a connection may be provided in the form of a feed-through, in particular if more than one bond is provided. However, it is likewise possible that a bond is formed as a mechanical connection between two workpieces, for example as a kind of linear connecting joint, and physical cohesion may as well be ensured by a further material that bonds the two workpieces together. Generally, therefore, the feed-through in which a material is enclosed by a further material which in turn is fixed in a feed-through opening provided in a third material, is also encompassed by the term "bond."

In the context of the present disclosure, the terms "connection" and "connecting element" are used largely synonymously. An exemplary form of the connecting element is a sealing element which provides a hermetical and in particular fluid-tight bond to the at least partially crystallized glass.

In the sense of the present disclosure, a "metal oxide having a medium-sized cation" is understood to mean a metal oxide having a medium-sized cation in the sense of the mineral classification according to Strunz, 9th edition. Accordingly, a medium-sized metal cation may have an ionic radius between 0.50 Å and 0.90 Å. In particular $Zr^{4+}$ is encompassed by the term "medium-sized cation."

Therefore, in the present disclosure, "metal oxide with a medium-sized cation" refers to $ZrO_2$, for example, and to those metal oxides in which at least 50% of the metal ions included in the oxide are present as medium-sized metal ions. Therefore, the crystal structure may in particular also comprise metal ions which are larger or smaller than a "medium-sized cation" in the sense of the present disclosure, for example when a partial replacement of one or more metal ions occurred. Thus, the relevant structure of the metal oxide is meant in the sense of the present disclosure. By way of example, it is possible in the first embodiment that part of the zirconium in $ZrO_2$ has been replaced by yttrium or its oxide.

According to a further exemplary embodiment, the at least partially crystallized glass is formed so that the pores are at least partially arranged in the vicinity of crystals.

This particular appearance of the at least partially crystallized glass is attributed to the fact that the pores are being formed during crystallization, in particular as a result of crystallization.

According to a further exemplary embodiment, the crystal content of the at least partially crystallized glass is at least 25%, based on the total volume of the at least partially crystallized glass, such as at least 50%, or at least 60%.

In some embodiments, porosity is at least 3% based on the total volume of the at least partially crystallized glass, such as at least 5%, at least 10%, or even 20%.

According to the first embodiment, the at least partially crystallized glass comprises the following oxides, in wt %:
$SiO_2$: 20 to 60, such as 25 to 50;
$Al_2O_3$: 0.5 to 20, such as 0.5 to 10;
CaO: 10 to 50;
MgO: 0.5 to 50, such as 0.5 to 10;
$Y_2O_3$: 0.1 to 20, such as 3 to 20;
$ZrO_2$: 0.1 to 25, such as 3 to 20;
$B_2O_3$: 1 to 15, such as 3 to 12,
wherein, furthermore, up to 0.25 wt % of $HfO_2$ may optionally be included.

According to the second embodiment, the at least partially crystallized glass may comprise the following oxides, in wt %:
$SiO_2$: 36 to 54, such as 40 to 54;
$Al_2O_3$: 8 to 16, such as 8 to 13;
CaO: 0 to 35, such as 5 to 25;
MgO: 0 to 17, such as 3 to 14;
RO: 8 to 39, such as 8 to 35;
$ZrO_2$: 0 to 25, such as 0 to 17;
$B_2O_3$: 0 to 3, such as 0 to 2 or 0,
wherein the amount of RO indicates the oxides BaO, SrO, MgO, ZnO, individually or in total or in any mixtures thereof.

In some embodiments, RO includes, individually or in any combination, in wt %:

| | |
|---|---|
| BaO | 0-36 |
| MgO | 0-22 |
| CaO | 0-25. |

In some embodiments, $Y_2O_3$=0. This may be achieved by replacing the $Y_2O_3$ by MgO and/or by CaO, for example, in the stabilization of the $ZrO_2$ crystal phase.

The crystal content of the at least partially crystallized glass may be more than 50 vol %, such as more than 60 vol %. This high crystal phase content additionally contributes to an increase in viscosity and thus results in enhanced mechanical stability at high temperatures. Furthermore, the high crystallization and thus partially occurring interlocking of the crystallites leads to a fixed position of the pores and thus essentially provides for the controlled porosity.

This at least partially crystallizable glass furthermore achieves its high temperature resistance in particular by virtue of a higher viscosity of the residual glass phase.

An important crystal phase of the at least partially crystallizable glass for amounts of $ZrO_2$>0 is, for example, Ca stabilized or Mg-stabilized $ZrO_2$.

This is a thermally more stable phase than $Y_2O_3$-stabilized $ZrO_2$.

Generally, however, $ZrO_2$ is difficult to be stabilized thermally, because when the temperature is lowered, a phase transition to less coordinated phases, for example from tetraclinic to monoclinic, may cause a volume jump with an associated decrease in volume, so that cracks might be caused thereby.

Consequently, the second embodiment uses crystal phases other than $ZrO_2$-based crystal phases in the at least partially crystallizable glass.

In some embodiments, the content of BaO in the at least partially crystallizable glass is less than 36 wt %. As a result, less chromate phase forms at the interface between the at least partially crystallizable glass to Cr-containing steels such as stainless steels, in particular if this interface is part of a bond or of a connecting element and feed-through element.

In the second embodiment, the at least partially crystallizable glass may be free of $B_2O_3$.

Inclusion of $B_2O_3$ in the first embodiment may be useful for many applications and temperature ranges. For example, the previously described $B_2O_3$ content leads to very good wetting at the joining partners even before crystallization, at moderate temperatures. This wetting is essential for a hermetically tight bond which is required in many applications. If, however, the bond is intended to be used at more than 1000° C., the $B_2O_3$ content is not necessarily advantageous, since it may cause a low viscosity of the residual glass phase at these temperatures, which may lead to a greatly reduced mechanical stability.

In the second embodiment, therefore, the use of $B_2O_3$ is largely dispensed with in the composition of the at least partially crystallizable or crystallized glass, which allows to have residual glass phases with high viscosities at temperatures above 1000° C. and thus mechanical stability up to 1200° C. or partly even more than 1200° C., such as up to 1270° C.

Furthermore, surprisingly, it is even possible in some embodiments to eliminate $Y_2O_3$ by replacing it with MgO and CaO, which can lead to considerable cost savings in the application.

Usually, $B_2O_3$ is needed for wetting a metal with glasses. Since the at least partially crystallizable glass of at least the second embodiment disclosed herein is capable of fusing to a metal at higher temperatures, which is also referred to as glass-sealing, it is possible according to the second embodiment, surprisingly, to even completely dispense with $B_2O_3$. This temperature, at which the at least partially crystallizable glass fuses to a metal or glass-seals in a feed-through element or connecting element to the enclosure thereof, is referred to as hemispherical temperature.

In some embodiments, the at least partially crystallized glass is configured such that the at least one crystal phase comprises a metal oxide having a medium-sized cation, and/or a chain silicate. In the sense of the present disclosure, "medium-sized cation" is understood to mean a cation which has an ionic radius between 0.5 Å and 0.9 Å and may be present in sixfold, for example octahedral coordination by oxygen. In particular the tetravalent zirconium ion $Zr^{4+}$ is encompassed by the term "medium-sized cation."

"Chain silicate" refers to those silicates in which the $SiO_4^{4-}$ tetrahedra are corner-linked in the form of endless ribbons or chains. Examples of such chain silicates include, for example, the minerals of pyroxenes. Another example of a chain silicate is wollastonite.

According to the first embodiment, the metal oxide may comprise $ZrO_2$ and may additionally comprise yttrium. The metal oxide may comprise yttrium-stabilized $ZrO_2$, such as in tetragonal modification.

According to some embodiments, the chain silicate comprises $SiO_3^{2-}$ as a silicate structural unit and may be an alkaline earth oxide-comprising chain silicate.

In some embodiments, the alkaline earth oxide is CaO and the chain silicate may further comprise yttrium. For example, the chain silicate may be in the form of wollastonite, such as yttrium-containing wollastonite.

In some embodiments, the chain silicate is in the form of an alkaline earth oxide-comprising chain silicate of a pyroxene structure, and the alkaline earth oxide may comprise CaO and MgO. For example, the chain silicate may be in the form of a diopside.

Furthermore, in some embodiments, the at least partially crystallized glass comprises two different chain silicates. By way of example, the at least partially crystallized glass may include wollastonite or Y-containing wollastonite and diopside. It is also possible that one or two chain silicates are present together with a metal oxide having a medium-sized cation, for example with $ZrO_2$, such as with Y-doped $ZrO_2$.

In some embodiments, the at least partially crystallized glass, in particular also in or as part of a bond of the at least partially crystallized glass with a joining partner, is formed such that the size of the pores is between 2 μm and 30 μm, such as between 5 μm and 25 μm.

According to some embodiments, the at least partially crystallized glass, in particular also in or as part of a bond of the at least partially crystallized glass with a joining partner, is formed such that the porosity has a gradient and such that at a distance of less than 10 μm, such as less than 20 μm from an interface of the at least partially crystallized glass to a joining partner, the porosity is less than 10%, such as less than 5% or less than 3%, wherein the porosity decreases towards the interface or towards the surface of the at least partially crystallized glass.

According to some embodiments, the porosity of the at least partially crystallizable glass, in particular also in or as part of a bond of the at least partially crystallized glass with a joining partner, has a gradient, wherein the porosity increases from the interface and/or the surface of the at least partially crystallized glass towards the interior thereof, and in particular increases to a maximum value which may be 20% or even more.

According to some embodiments, the crystallites of the at least partially crystallizable glass, in particular also in or as part of a bond of the at least partially crystallized glass with a joining partner, have a size from 0.1 μm to 50 μm.

In all the described embodiments, advantageous properties result for a bond, in particular a bond to a metal and also for a feed-through element or connecting element, if this bond comprises an at least partially crystallized glass as disclosed herein.

Decisive properties of the at least partially crystallized glass also include the electrical properties thereof. The at least partially crystallized glass may be electrically insulating, which is particularly important for feed-throughs in which two electrically conductive materials, such as metals, are joined together, while these materials should remain electrically insulated from each other.

Furthermore, the electrical resistance that can be measured between the two materials joined to one another by the at least partially crystallized glass depends not only on the specific volume resistance of the electrically insulating at least partially crystallized glass but also on the implemented geometry of the feed-through element or connecting element.

According to some embodiments, the at least partially crystallized glass provides high electrical insulation up to 350° C., such as up to 600° C. or up to 900° C. High electrical insulation herein means a value between $10^8$ and $10^{14}$ ohm·cm at a temperature of 350° C.

Thus, the thermal expansion coefficient of the crystal phases included in the at least partially crystallized glass differs only by at most $\pm 4*10^{-6}/K$ from the thermal expansion coefficient of the green glass and also of the residual glass phase. The thermal expansion coefficient of the crystal phases included in the at least partially crystallized glass may be between $5*10^{-6}/K$ and $12*10^{-6}/K$. It is assumed that the improved mechanical stability is also promoted by this relationship of the thermal expansion coefficients. What is meant herein is the coefficient of linear thermal expansion according to ISO 7991.

It has moreover been found that the pores of the at least partially crystallized glass are not already completely created or not already existing in the sintered body which is formed from green glass and from which the at least partially crystallized glass is obtained. Rather, a sintered compact or sintered body with a high sintering degree is achieved. The sintering degree can be determined here by the ratio of actual density, i.e., the density of the sintered body as determined by measurement, for example, and the theoretical density of the sintered body. The actual density of the sintered body or sintered compact may be lower by not more than 10%, such as by not more than 5% than the theoretical density of the at least partially crystallizable but not yet crystallized glass without any pores. In this case, the sintering degree is at least 95%, such as at least 97%, at least 98%, or at least 99%.

Here, the theoretical density is the value which would be obtained for a shaped body of the same stoichiometric composition and without any pores. If, for example, the relevant body is a sintered compact or sintered body made from glass powder, for example from an at least partially crystallizable glass powder, then the theoretical density corresponds to the density of the dense glass obtained by a melting process. Since the sintered body is obtained from glass powder, by pressing and a thermal compression step, it will usually have a lower density, for technical reasons, which can serve as a measure for the sintering degree. The deviation between theoretical density and actual density is preferably as small as possible.

As already mentioned above, it has now been found, surprisingly, that the pores of the at least partially crystallized glass are not already completely created or not already existing in the sintered compact or sintered body, but rather a majority thereof is created simultaneously with or during the crystallization. The statement that the pores of the at least partially crystallizing glass are not already completely created or not already existing in the sintered compact or sintered body due to the process of sintering, in the sense of the present disclosure, that only relatively few pores will remain of those pore which were caused by the process of sintering and were not formed during crystallization simultaneously with the crystallization in the at least partially crystallizable glass.

For a sintering degree of about 99%, for example, the ratio of the pores already created or existing in the sintered body, sintered compact or shaped body relative to the pores formed according to the disclosure, is approximately at least 1.8 or even higher.

Particularly surprisingly, the greater the porosity Φ is the higher the temperature is chosen during a thermal treatment. More particularly, with an increase in temperature, both the average size of the pores and their volume increases. This allows selective control of the porosity by choosing the temperature and the holding time at a certain temperature.

Usually, a person skilled in the art would expect that the density of a compound increases the higher the temperature of a thermal treatment is chosen. Nevertheless, surprisingly, the creation of controlled porosity does not affect the tightness of the bond. Rather, a fluid-tight and substantially hermetically tight bond is still possible, in particular due to the structured arrangement or structured distribution of the pores.

Also surprisingly, it has been found that with the structurally distributed porosity of the at least partially crystallized glass and at the same time the hermeticity of the bond, a particularly high mechanical stability of the feed-through element or connecting element is achieved. For example, it has been found that the pores suppress crack propagation in the shaped body, so that cracks which lead into a pore do not propagate further therefrom.

In particular it has been found that, after the at least partial crystallization, the resulting microstructure is stable enough so that even a temperature load in the range of the crystallization temperature does not lead to any significant change in the microstructure in terms of its crystallization degree. It is therefore possible, for example, that the operating temperature of the so obtained at least partially crystallized glass is at or even above the crystallization temperature. This in particular even allows to produce feed-through elements or connecting elements comprising such an at least partially crystallized glass with very high operating temperatures, which are for example in the range of the crystallization temperature.

A shaped body, i.e., a shaped sintered compact or shaped sintered body made from an at least partially crystallizable glass, can be produced by a method which comprises at least the following:

(1) Melting a green glass. The melting of the green glass is performed in conventional manner by mixing together starting materials, the so-called batch, in a heat-resistant container, the so-called melting unit, and heating them to a temperature at which the batch is in a completely molten state, which is usually at least 1200° C., for example, and may be together with rapid cooling, which may be achieved by water-cooled rollers at room temperature, in particular as described further herein. It is furthermore possible to add additives to the batch, which serve to optimize the melting process, for example in the form of refining agents. Usually, the melting may be achieved in the trough or in a crucible. During the melting process, further actions may be performed, for example for homogenization of the melt. Here, the green glass is a glass having the composition of the at least partially crystallized glass, but may be in a non-crystallized state.

(2) Discharging the liquid glass from the melting unit. The melt obtained in (1) is discharged from the melting unit, optionally after performing other actions, such as for homogenization of the melt. This may be achieved by a rolling process, for example, with equipment coupled to a melting trough. But it is also possible that the melting unit is in the form of a crucible and the discharging of the liquid glass may be achieved by pouring. Particularly, the discharging may comprise pouring, in particular between at least two water-cooled rollers so that ribbon-shaped glass bodies are obtained. Here, a body is referred to as a ribbon-shaped glass body if its mean thickness, for example as defined by the width of the gap between the at least two rollers, is less than the spatial dimension along the extension of the gap and furthermore if the spatial dimension in the pouring direction is greater than the spatial dimension in parallel to the extension of the gap, so that flat elongated glass bodies are obtained.

(3) Grinding the glass bodies obtained in (2) so as to obtain a glass powder. Grinding into the powder may be achieved in conventional equipment, for example in a ball mill, and the grinding process may be a wet process, i.e. using a liquid medium such as water or water with a further liquid added, for example an organic liquid such as an alkanol, or else using an organic liquid such as an alkanol.

(4) Granulating the glass powder. The glass powder obtained in (3) is granulated, i.e. other substances are added, which are known in the art, for example adjusting agents on an organic basis. Furthermore, it is also possible to add further substances which may promote the formation of pores, for example, such as in the form of substances which decompose when exposed to thermal energy and thereby release at least one fluid phase, for example a gas. By way of example, such further substances include carbonate-containing substances which decompose to form $CO_2$, or water-containing substances, for example hydroxides or hydrates which decompose to form water. However, it has been found that pores also form without the addition of such other substances. If such substances are added, these further substances are merely intended to further selectively influence the formation of pores, but they are in principle not necessary for the implementation of the disclosure.

(5) Pressing. The granulated powder is then compressed, and the pressing is performed according to conventional pressing processes, such as by applying an isostatic pressure or by hot isostatic pressing (HIP). Moreover, shaping may be achieved by extrusion or injection molding.

(6) Sintering. The compressed, extruded or injection molded body is then sintered. The sintering may be determined by indicating the ratio of the actual density of the sintered body, as determined by measurement, for example, relative to the theoretical density (derived from the density of the green glass). A sintering degree may be achieved for which the actual density of the sintered body is lower than the theoretical density by not more than 10%. The sintering may therefore be performed so as to achieve a high sintering degree. The sintering is achieved by heating the compressed body to a temperature $T_S$.

If the sintered compact or sintered body has not yet attained the desired shape in the above-described method, it may optionally be given this shape by further material processing to be transformed into the shaped body.

To produce a bond of an at least partially crystallized glass with an enclosure material or a sealing element, such as a temperature-stable enclosure material or sealing element, the method may also include the following.

The material of the joining partner, such the material of an enclosure material or sealing element, and the resulting bond may comprise a metal, in particular a metal from the group of steels, such as standard steels, stainless steels, rustproof steels, and high-temperature stable ferritic steels, which are also known under the brand name Thermax, for example Thermax 4016, Thermax 4742, or Thermax 4762, or Crofer 22 APU or CroFer 22 H, or NiFe-based materials, e.g., NiFe45, NiFe47, or nickel plated pins, or known under the brand name Inconel, for example Inconel 718 or X-750, or steels such as known under the designations CF25, Alloy 600, Alloy 625, Alloy 690, SUS310S, SUS430, SUH446, or SUS316, or austenitic steels such as 1.4828 or 1.4841, or a high-temperature stable ceramic compound such as an alumina-based ceramic or a zirconia-based ceramic, for example a ceramic comprising Y-stabilized zirconia.

(7) Heating the positively connected materials to a temperature $T_2$, which is greater than $T_1$, so that the green glass is caused to at least partially crystallize, so that an at least partially crystallized glass is provided which comprises pores, wherein the pores have a structured distribution.

(8) Bringing the sintered green glass body or sintered compact between or onto the material to be joined of at least one joining partner, in particular the material of an enclosure or of a sealing element and feed-through element. A sintered preform of the shaped body made of an at least partially crystallized glass is already obtained in (6). This sintered preform is now introduced into or caused to contact the material of the joining partner, in particular the material of an enclosure or a sealing element. A shaped body, i.e. a shaped sintered compact or shaped sintered body made of an at least partially crystallizable glass, is also referred to as a sintered preform if it is suitable and intended to be received in an enclosure of a feed-through element or connecting element, for example, in order to be further processed therewith. The sintered preform may already have the substantially final shape of the shaped body if it has been brought into the shape desired for the shaped body already by the sintering process. However, the shaped body may be obtained by a shaping treatment, in particular a material-removing shaping treatment of the sintered preform or sintered compact, in order to obtain the desired shape in this way, although such optional material processing might also be detrimental, especially if too many pores possibly still existing in the sintered body or sintered compact should be exposed thereby, which could subsequently have a detrimental effect on the interface between the at least partially crystallized glass and the joining partner, in case those pores cannot escape or be absorbed during the thermal treatment.

(9) Glass sealing. Heating the materials, in particular the material of the sintered green glass body or sintered compact and the material to be joined, in particular the material of a joining partner, in particular the material of the enclosure or of the sealing element and feed-through element, to a temperature $T_1$, so that the sintered green glass body is caused to flow, with the result that the materials to be joined, in particular the material of the joining partner and in particular the material of the enclosure or of the sealing element and feed-through element are wetted by the green glass and a positive connection is provided between the material of the green glass body and the material of the joining partner, in particular the material of the enclosure or of the sealing element and feed-through element. After the sintered preform has been brought into or onto an enclosure or a sealing element, glass sealing is then achieved by heating the assembly which comprises at least the joining partner, in particular the enclosure or the sealing element, and the sintered preform, to a temperature $T_1$. The latter is higher than $T_S$. During the glass sealing, first, the sintered green glass body is caused to flow at the temperature $T_1$, with the result that the materials to be joined are wetted by the green glass and a positive connection is provided. Subsequently, the bonded materials may be heated to a temperature $T_2$ which is greater than $T_1$, so that the green glass is caused to at least partially crystallize, so that an at least partially crystallized glass is provided which comprises pores, wherein the pores have a structured distribution. With the glass sealing, a maximum load temperature, $T_{max}$, of the shaped body made of at least partially crystallized glass is achieved, which is more than 900° C. in the first embodiment, and in the second embodiment, a maximum load temperature, $T_{max}$, of more than 1100° C. such as 1200° C. of the shaped body made of at least partially crystallized glass is achieved.

In this case, the temperature may be raised steadily over time, or predefined holding times may be respected at specific temperatures, at one or more of these temperatures, such as at $T_1$ or $T_2$.

Furthermore, the temperature-time profile may be chosen such that a structurally distributed, such as a controlled, porosity is created, wherein this temperature-time profile uses a rate of temperature rise or heating rate of 10 to 200 K/min, such as 20 to 180 K/min or 50 to 150 K/min. In some embodiments, the holding temperature is between 900° C. and 1050° C. and the holding time is between 20 minutes and 120 minutes, such as between 20 minutes and 60 minutes, or even up to 150 minutes. In the second embodiment, the holding temperatures may be selected between at least 950° C. and at most 1200° C., with the same holding times. In the second embodiment, the holding temperature is at least 1050° C. and at most 1150° C.

In this way, a bond of an at least partially crystallized glass with an enclosure material or a sealing element, such as a temperature-stable enclosure material or sealing element, which may comprise a metal is obtained with an at least partially crystallized glass as described above.

This bond is fluid-tight, and may be hermetically tight.

It has been found that, most surprisingly, by combining specific temperatures and holding times at a maximum temperature it is possible to obtain a pore-containing structure in which the pores are distributed in a structured manner, in particular when using a shaped body or sintered compact obtained as described above. It is in this sense, when describing a controlled porosity. The holding time at maximum temperature is between 20 and 120 minutes, such as 30 to 60 minutes, and in the first embodiment the holding temperatures are selected between at least 900° C. and at most 1050° C. The holding temperature may be, for example, at least 950° C. and at most 1010° C.

In the second embodiment, the holding temperatures may be selected between at least 950° C. and at most 1200° C. The holding temperature may be, for example, at least 1050° C. and at most 1150° C. in the second embodiment.

In some cases, the holding time may be up to 150 minutes.

Some exemplary embodiments disclosed herein relate to a bond of an at least partially crystallized glass with an enclosure material, such as a temperature-stable enclosure material, which may be a metal, wherein the bond comprises an at least partially crystallized glass formed according to exemplary embodiments of the disclosure.

According to a further embodiment of the bond, the enclosure material in particular comprises a metal from the group of steels, such as standard steels, stainless steels, rustproof steels, and high-temperature stable ferritic steels, which are also known under the brand name Thermax, for example Thermax 4016, Thermax 4742, or Thermax 4762, or Crofer 22 APU or CroFer 22 H, or NiFe-based materials, e.g. NiFe45, NiFe47, or nickel plated pins, or known under the brand name Inconel, for example Inconel 718 or X-750, or steels such as known under the designations CF25, Alloy 600, Alloy 625, Alloy 690, SUS310S, SUS430, SUH446, or SUS316, or austenitic steels such as 1.4828 or 1.4841, or a high-temperature stable ceramic compound such as an alumina-based ceramic or a zirconia-based ceramic, for example a ceramic comprising Y-stabilized zirconia.

The bond of an at least partially crystallized glass with an enclosure material may be formed such that in the region of contact between the at least partially crystallized glass and the enclosure material, that is at the interface between the at least partially crystallizable glass and the joining partner, the number of pores is smaller or no pores are existent at all.

At a distance of less than 1 μm in the at least partially crystallized glass from the interface with the enclosure material and/or to the surface, porosity may drop to a value of less than 10%, such as less than 5% or less than 3%.

In this case, the interface between the enclosure material and the at least partially crystallized glass may be formed such that there are virtually no defects at this interface, rather the enclosure material is uniformly wetted by the at least partially crystallized glass. This may be achieved by having no disturbing side reactions occurring at the interface itself, in particular no crystallization in the sense of a heterogeneous crystallization at the interface. Rather, the crystallization of the starting glass takes place in such a way that it occurs in the glass itself, and interfacial reactions at the boundary to the enclosure material could not be discovered so far.

The interface between the enclosure material and the at least partially crystallized glass is moreover substantially free of bubbles or inclusions. This is also achieved by the particularly good wetting.

Some exemplary embodiments disclosed herein relate to a feed-through element or connecting element which comprises an at least partially crystallized glass according to the exemplary embodiments described previously.

The feed-through element or connecting element may comprise at least one further material, wherein the difference in the coefficients of thermal expansion between the at least partially crystallized glass and the at least one further material is less than $3*10^{-6}$/K.

This provides for a very high stability of the feed-through element or connecting element. Also, the coefficient of thermal expansion of the crystal phases included in the at least partially crystallized glass differs from the coefficient of thermal expansion of the green glass by not more than $+/-4*10^{-6}$/K. The thermal expansion coefficient of the crystal phases included in the at least partially crystallized glass may be between $5*10^{-6}$/K and $12*10^{-6}$/K.

The bond may be formed so as to be fluid-tight, such as hermetically tight.

According to some exemplary embodiments, the at least one further material is a temperature-stable material, such as a temperature-stable metal, in particular a temperature-stable ceramic, in particular a material of an enclosure and/or in particular a material of an enclosure of a feed-through element or connecting element.

Some exemplary embodiments disclosed herein relate to a method for producing a bond between an at least partially crystallized glass and an enclosure material, in particular the enclosure material of a feed-through element or connecting element, for example in the form of a metal-to-glass bond. This method comprises:

(1) bringing a sintered green glass body or sintered compact between or onto the material to be joined of at least one joining partner, in particular the material of an enclosure or of a sealing element and feed-through element;

(2) heating the materials, in particular the material of the sintered green glass body or sintered body and the material to be joined, in particular the material of a joining partner, in particular the material of the enclosure or of the sealing element and feed-through element, to a temperature $T_1$, so that the sintered green glass body is caused to flow, with the result that the materials to be joined, in particular the material of the joining partner and in particular the material of the enclosure or of the sealing element and feed-through element are wetted by the green glass and a positive connection is provided between the material of the green glass body and the material of the joining partner, in particular the material of the enclosure or of the sealing element and feed-through element;

(3) heating the positively connected materials to a temperature $T_2$ which is greater than $T_1$, so that the green glass is caused to at least partially crystallize, so that an at least partially crystallized glass is provided which comprises pores, wherein the pores have a structured distribution.

Some exemplary embodiments disclosed herein relate to a sintered body which is accessible to the formation of a structurally distributed porosity, such as a controlled porosity. The sintered body comprises an at least partially crystallizable glass, wherein the sintered body has a density which corresponds to at least 90% of the theoretical density, such as at least 95% of the theoretical density.

In the first embodiment, the sintered body may have the following composition, in wt %:

$SiO_2$: 20 to 60, such as 25 to 50;
$Al_2O_3$: 0.5 to 20, such as 0.5 to 10;
CaO: 10 to 50;
MgO: 0.5 to 50, such as 0.5 to 10;
$Y_2O_3$: 0.1 to 20, such as 3 to 20;
$ZrO_2$: 0.1 to 25, such as 3 to 20;
$B_2O_3$: 1 to 15, such as 3 to 12,
wherein, furthermore, up to 0.25 wt % of $HfO_2$ may optionally be included.

The sintered body of the second embodiment may comprise the following composition, in wt %:

$SiO_2$: 36 to 54, such as 40 to 54;
$Al_2O_3$: 8 to 16, such as 8 to 13;
CaO: 0 to 35, such as 5 to 25;
MgO: 0 to 17, such as 3 to 14;
RO: 8 to 39, such as 8 to 35;
$ZrO_2$: 0 to 25, such as 0 to 17;
$B_2O_3$: 0 to 3, such as 0 to 2 or 0,
wherein the amount of RO indicates the oxides BaO, SrO, MgO, ZnO, individually or in total or in any mixtures.

In some embodiments, RO includes, individually or in any combination thereof, in wt %:

| | |
|---|---|
| BaO | 0-36 |
| MgO | 0-22 |
| CaO | 0-25. |

More generally the sintered body may comprise an at least partially crystallizable glass as described previously.

EXAMPLE

The disclosure will now be explained by way of an example.

In the first embodiment, an exemplary at least partially crystallizable glass which can be used to obtain an at least partially crystallized glass according to the disclosure is given by the following composition, in wt %:

| | |
|---|---|
| $SiO_2$ | 35.8 |
| $B_2O_3$ | 8.6 |
| $Al_2O_3$ | 2.4 |
| CaO | 30.3 |
| MgO | 3.8 |
| $Y_2O_3$ | 11.7 |
| $ZrO_2$ | 7.4. |

According to the second embodiment, an exemplary at least partially crystallizable glass which can be used to obtain an at least partially crystallized glass is given by the following composition for a first at least partially crystallizable glass G1 of the second embodiment and for a second at least partially crystallizable glass G2 of the second embodiment, in wt %:

| Oxides | G1 [wt %] | G2 [wt %] |
|---|---|---|
| $SiO_2$ | 40.8 | 45 |
| $Al_2O_3$ | 12.7 | 11.3 |
| MgO | 11.5 | 7.5 |
| CaO | 10.5 | 18.7 |
| $ZrO_2$ | 24.5 | 17.5 |

An exemplary at least partially crystallizable glass which can be used to obtain an at least partially crystallized glass according to the second embodiment is given by the following composition for a third at least partially crystallizable glass G7 and for a fourth at least partially crystallizable glass G8, of the second embodiment in each case, in wt %:

At least partially crystallizable glass G7

| Oxides | wt % |
|---|---|
| $SiO_2$ | 50.9 |
| $Al_2O_3$ | 15.9 |
| CaO | 13.2 |
| MgO | 14.4 |
| $ZrO_2$ | 5.6 | and
At least partially crystallizable glass G8

| Oxides | wt % |
|---|---|
| $SiO_2$ | 54 |
| $Al_2O_3$ | 13.5 |
| CaO | 22.5 |
| MgO | 3.0 |
| $ZrO_2$ | 7.0 |

Reference will now be made to exemplary embodiments which will be described in more detail in terms of their properties.

Some exemplary embodiments disclosed herein provide hermetically tight and mechanically stable bonds between an at least partially crystallizable or partially crystallized glass and a metal or enclosure material, in particular of a feed-through element or connecting element. Such feed-through elements or connecting elements may remain substantially hermetically tight and in particular mechanically stable above 1000° C., such as up to 1250° C., at least in case of the second embodiment, and can therefore be used in substantially continuous operation in exhaust systems of motor vehicles, especially in exhaust gas cleaning systems thereof. Certain exemplary embodiments formed according to the second embodiment were even observed in which the bonds and feed-through elements and connecting elements described herein withstood temperatures of up to 1270° C. substantially hermetically tight and mechanically stable under continuous operation.

A measure for these properties is the hemispherical temperature, for example, which is at least approximately 1200° C. in the case of the at least partially crystallized glasses of the second embodiment disclosed herein, and which is even significantly higher in some examples of the second embodiment.

The material of the first embodiment is temperature resistant and hermetically tight only up to about 1050° C. However, special applications require temperatures of about 1200° C. or even higher.

In addition to the advantages already described above, a difference between the second embodiment and the first embodiment, which contributes to the improved temperature resistance, is due to the yttrium-free, in particular $Y_2O_3$-free, crystal phases. Furthermore, these crystal phases may also be free of zirconium, in particular free of $ZrO_2$.

The at least partially crystallizable glass of the second embodiment disclosed herein may be free of $B_2O_3$ or have only very low $B_2O_3$ contents of less than 1 wt % and therefore be chemically more stable than the glass of the first embodiment.

Referring now to the accompanying figures and initially to FIG. 1, which shows a photograph of a feed-through element or connecting element 10 which comprises an enclosure 4.1 that may comprise a metal, and a sintered body 1 arranged therein, in particular in the form of a sintered preform comprising or made of the at least partially crystallized glass 2, after the temperature treatment as described above for producing a feed-through element or connecting element 10.

In this temperature treatment, the molten sintered body 1 was glass-fused to the enclosure 4.1, and at the same time with crystallization, pores 21 were formed which will be described in more detail below with reference to further figures.

Furthermore, a functional element 5 can be seen, which may comprise an electrical conductor, for example.

Generally, in the context of the present disclosure, joining partners may be specified to be functional elements and/or enclosures or enclosure materials, in particular as described herein, and sealing elements or materials of sealing elements.

Figure 2:
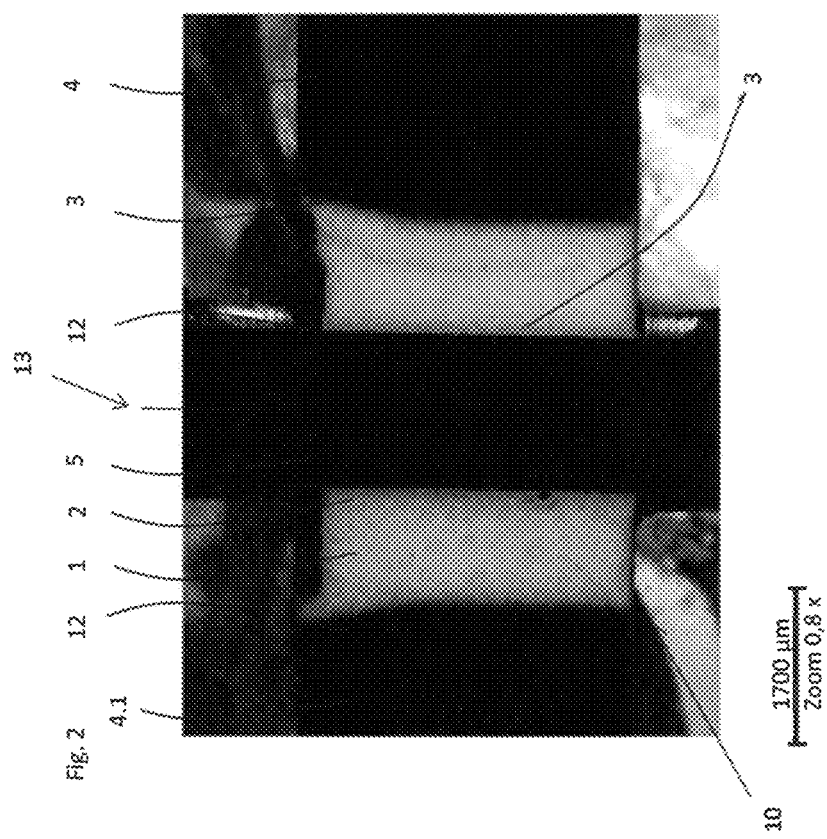
FIG. 2 is a photograph of a cross-sectional view of the feed-through element or connecting element of FIG. 1, which shows a sectional plane extending approximately in parallel to the axis of symmetry or longitudinal axis thereof and thus extending in a plane in which this axis of symmetry or longitudinal axis lies.

FIG. 2 is a photograph of a cross-sectional view of the essentially cylindrical and cylinder-symmetrical feed-through element or connecting element 10 shown in FIG. 1, which shows a sectional plane extending approximately in parallel to the axis of symmetry or longitudinal axis 13 thereof and thus extending in a plane in which this axis of symmetry or longitudinal axis 13 lies.

This photograph of FIG. 2 as well as those of FIGS. 3, 4, 5, and 6 were obtained after the respective sample bodies, in particular feed-through elements or connecting elements 10 or the at least partially crystallizable glass 2 had been severed, for example across the center thereof, by sawing using a fine saw and subsequent polishing.

In each case, the feed-through element or connecting element 10 comprises a bond 12 of the at least partially crystallized glass with the functional element 5 and with the enclosure material 4 of the enclosure 4.1.

Here, the functional element 5 and the enclosure material 4 of the enclosure 4.1 each provide at least one respective joining partner with a respective interface 3 between the at least partially crystallized glass 2 and the at least one joining partner 4, 5.

As far as reference is made to "material of the enclosure" or to "enclosure material" in the context of the present disclosure, these two terms refer to the same subject-matter.

As will be described in more detail herein, the at least partially crystallizable glass has a porosity which decreases towards the respective interface 3 between the at least partially crystallized glass 2 and the respective joining partner 4, 5.

Figure 3:
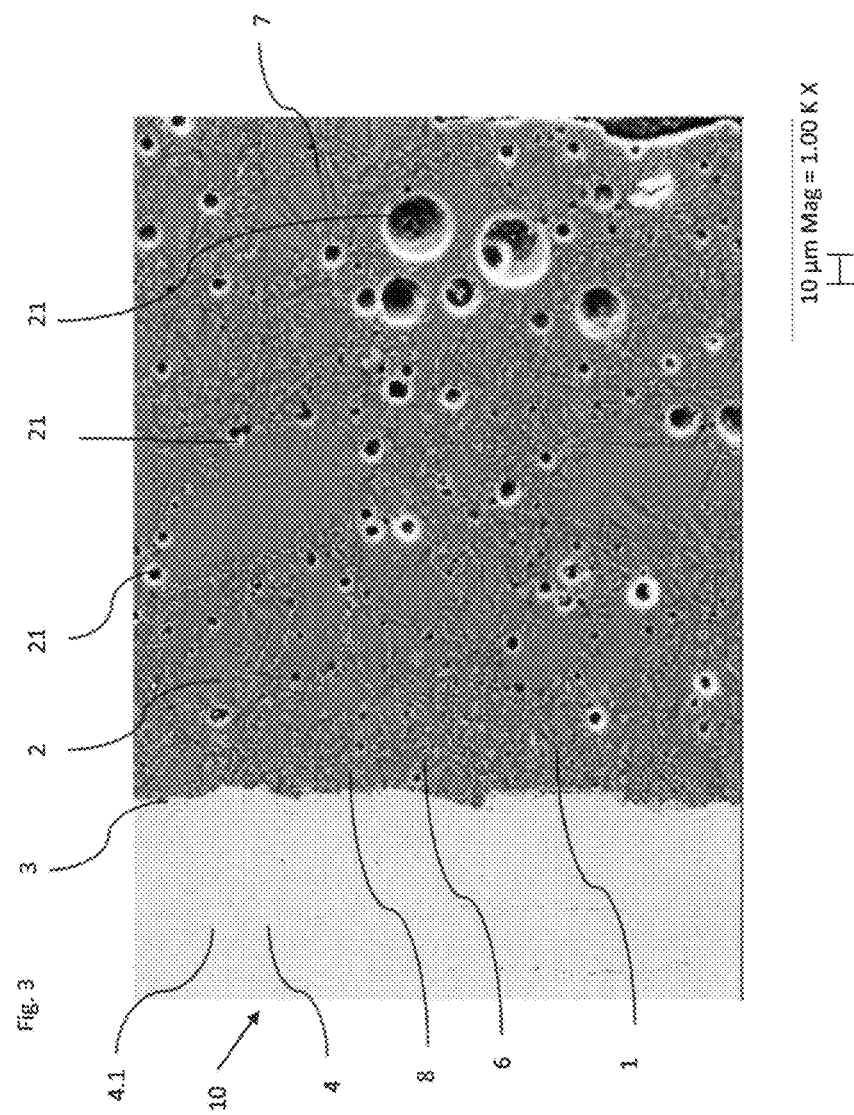
FIG. 3 is an electron micrograph of a detail in the region of the cross-sectional view of the feed-through element or connecting element of FIG. 2, approximately one thousand times enlarged, which shows the interface between the at least partially crystallizing glass and the material of the enclosure.

The bond 12 comprises a respective interface 3 between the at least partially crystallized glass 2 and the respective at least one joining partner 4, 5, and the at least partially crystallized glass 2 comprises at least one crystal phase 6 and pores 21 which are distributed in the at least partially crystallized glass 2 in a structured manner and can be seen, for example, from FIG. 3 in which the crystal phase 6 is well discernable as a crystalline region from the crystal-like structures thereof.

It can be found here, in particular by measuring, that the respective crystallites in the at least partially crystallized glass 2 have a size between 0.1 µm and 50 µm. Crystallites 7 and 8 are indicated by reference numerals, by way of example. The size of a crystallite 7, 8 refers to the greatest spatial extent of the crystallite 7, 8 in any spatial direction in this case. For example, the size of needle-shaped crystallites is defined by the longest major axis thereof.

FIG. 3 is an electron micrograph of a detail in the region of the cross-sectional view of the feed-through element or connecting element 10 shown in FIG. 2, approximately one thousand times enlarged, which clearly shows the interface 3 between the at least partially crystallizing glass 2 and the material of the enclosure 4.1.

It can also be seen in FIG. 3, from the density of pores 21, that the porosity sharply decreases close the interface 3 and that there are even substantially no pores 21 at all at the interface 3.

Here, the porosity has a gradient, and at a distance of less than 10 µm, in particular at a distance of less than 20 µm from the interface 3 of the at least partially crystallized glass 2, the porosity is less than 10%, and in particular in the view of FIG. 3 it is even less than 5%, and moreover even less than 3%. It can also be clearly seen here, that the porosity decreases towards the interface 3 between the at least partially crystallized glass 2 and the joining partner 4.4, 4. FIG. 3 includes a legend with a scale, where the length of 10 µm is indicated, so that the lengths of 10 µm and 20 µm become easily apparent.

FIG. 3 shows a further advantageous characteristic of the bond 12 and the feed-through element and connecting element, in particular that a smaller number of pores 21 or even no pores 21 at all are located at the interface 3 between the at least partially crystallized glass 2 and the joining partner 4.1, 4, and that the porosity drops to a value of less than 5% at a distance of 1 µm, or else of 2 µm in the at least partially crystallized glass 2 or in the at least partially crystallizing glass from the interface 3 to the joining partner 4.1.

It can also be seen from FIG. 3 that the porosity has a gradient and that the porosity increases from the interface 3 and/or the surface of the at least partially crystallized glass 2 towards the interior thereof and in particular increases to or tends toward a maximum value. This maximum value of porosity may be 20% or more.

Figure 4:
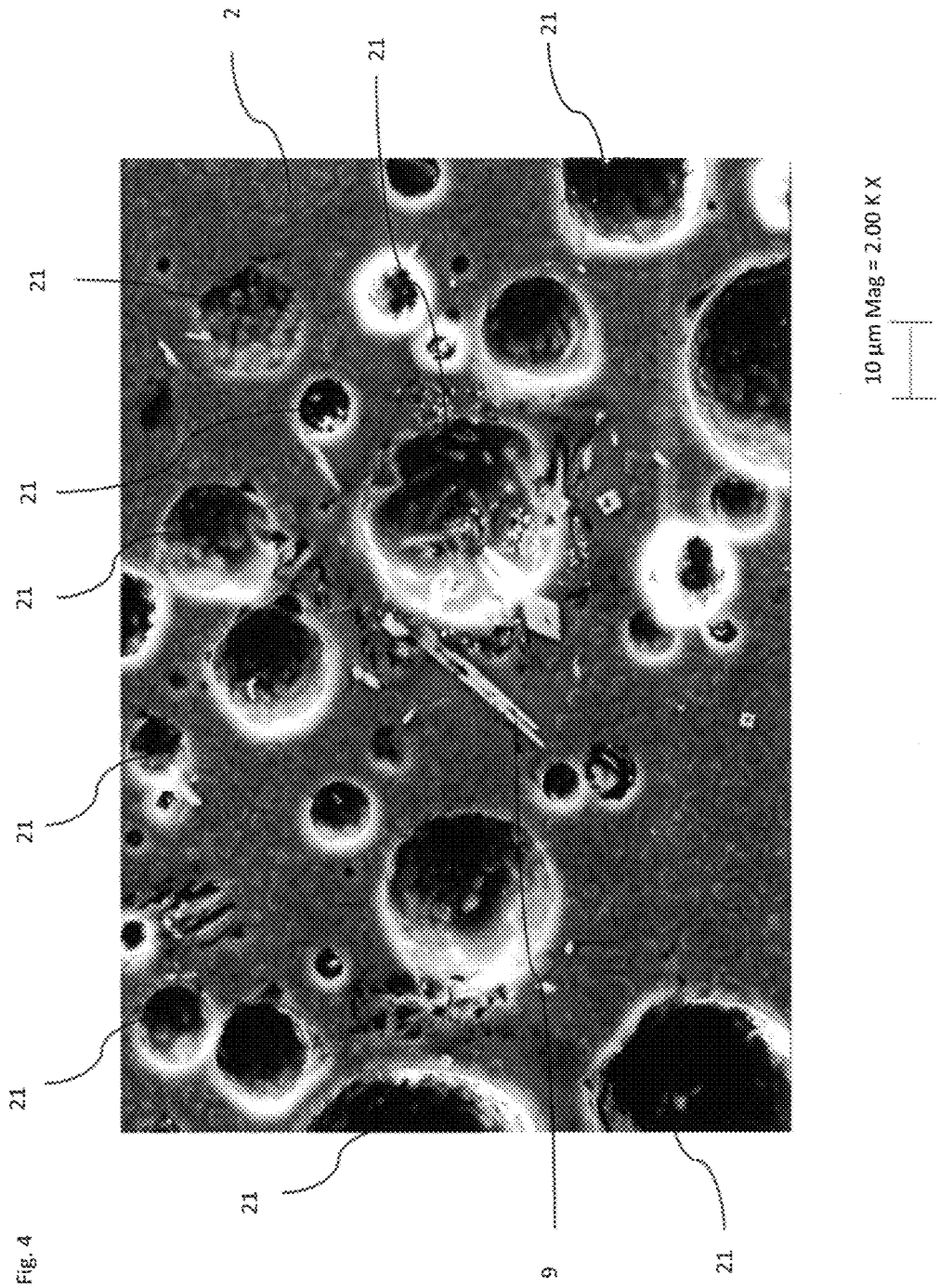
FIG. 4 is an electron micrograph of a detail in the region of the cross-sectional view of the feed-through element or connecting element of FIG. 2, approximately two thousand times enlarged, in which the size of the pores in the at least partially crystallized glass can be seen after the glass has been subjected to a temperature load at 1200° C. for more than 10 minutes.

Referring now to FIG. 4, which is an electron micrograph of a detail in the region of the cross-sectional view of the feed-through element or connecting element 10 shown in FIG. 2, approximately two thousand times enlarged, in which the size of the pores 21 in the at least partially crystallized glass can be seen. For this purpose, FIG. 4 also has a legend which indicates the length of 10 µm.

It can be seen that in the at least partially crystallized glass the pores have a size between 2 µm and 30 µm, and thus also between 5 µm and 25 µm, which is also confirmed by respective measurements.

The size of the pore 21 is defined in each case as the greatest length dimension in any spatial direction, which approximately corresponds to a diameter of the respective pore 21, since the latter has a substantially spherical shape.

FIG. 4 also shows that the pores 21 are located at least partially in the vicinity of crystals or crystallites 9. Here, the terms crystal and crystallite are used interchangeably in the context of the present disclosure.

The partially crystallized glass 2 shown in the present figures has a crystal content of at least 25%, based on the total volume of the at least partially crystallized glass 2, and in certain embodiments even of at least 50% and in some embodiments even of at least 60%. The crystal content can be adjusted accordingly through the holding time at the respective disclosed holding temperature.

Based on the volume, in particular the total volume of the at least partially crystallizable glass, porosity is at least 3%. The holding time can also be adjusted accordingly through the holding time at the respective holding temperatures. This porosity may be at least 5%, such as at least 10%, based on the total volume of the at least partially crystallizable glass 2.

The bond 12 of the feed-through element or connecting element 10 as illustrated in particular in FIGS. 2 and 3 is fluid-tight and even substantially completely hermetically tight.

In the feed-through element or connecting element 10, the material of the joining partner, in particular the material 4 of the enclosure 4.1, is a temperature-stable material and may be or comprises a temperature-stable metal or a temperature-stable ceramic.

The material of the joining partner, i.e. the enclosure material 4 of the enclosure 4.1 or the material of functional element 5 comprises in particular a metal from the group of steels, such as standard steels, stainless steels, rustproof steels, and high-temperature stable terrific steels, which are also known under the brand name Thermax, for example Thermax 4016, Thermax 4742, or Thermax 4762, or Crofer 22 APU or CroFer 22 H, or NiFe-based materials such as NiFe45, NiFe47, or nickel plated pins, or known under the brand name Inconel, for example Inconel 718 or X-750, or steels such as known under the designations CF25, Alloy 600, Alloy 625, Alloy 690, SUS310S, SUS430, SUH446, or SUS316, or austenitic steels such as 1.4828 or 1.4841, or a high-temperature stable ceramic compound such as an alumina-based ceramic or a zirconia-based ceramic, for example a ceramic comprising Y-stabilized zirconia.

It is useful if a joining partner with at least one material, for example the enclosure material 4 of the enclosure 4.1 and/or in particular at least one further material, for example the material of the functional element 5, for which the difference in the thermal expansion coefficients between the at least partially crystallized glass 2 and the material of the joining partner 4.4, 5, is than $3*10^{-6}$/K.

The explanations for the at least partially crystallizable glass 2 of the second embodiment as detailed previously apply in the same way for the first embodiment of the at least partially crystallizable glass, except for the respectively indicated temperatures of the thermal processes and the temperature stability and the holding times.

A particularly useful property of the at least partially crystallized glass 2 is that it comprises at least one crystal phase 6 and pores 21 which are distributed in a structured manner in the at least partially crystallized glass 2.

The improved thermal properties of the at least partially crystallizable glass 2 and of a bond 12 or of a feed-through element or connecting element 10 comprising this at least partially crystallizable glass 2 can be determined by heating microscopic procedures, for example.

In heating microscopy, a sample located in the field of view of a heating microscope is exposed to defined thermal conditions and can be viewed as a function of temperature and recorded by imaging.

Advantageously, in these procedures, temperature changes are made so slowly that the observed sample is always in its thermal equilibrium.

A hermetic bond, for example between an at least partially crystallizing or already partially crystallized glass 2 and a metal, for example, is usually selected approximately at the level of the so-called spherical temperature of the glass or may usually deviate therefrom by about ±80 Kelvin, such as ±20 Kelvin (i.e. ±20° C.).

This spherical temperature can be determined by a heating microscopic procedure and marks the temperature at which an initially cylindrical sample has been fused into a spherical mass, in the present case typically the sintered body 1 or sintered compact 1 which is also referred to as a sintered preform or shaped body in this configuration, since this is intended to produce a bond 12, in particular in a feed-through element or connecting element 10.

The spherical temperature is typically found at a viscosity of about log η=5.4.

The symbols in Table 1 below have the following meanings:

$T_{SP}$—Softening point of the at least partially crystallizing glass above which wetting occurs, for example wetting of a metal of a connection or of a material of an enclosure of a feed-through element or connecting element.

$T_{sph}$—Spherical temperature which indicates the upper temperature limit for hermeticity and mechanical resistance of a bond between the at least partially crystallizing glass and a metal of a bond or a material of an enclosure of a feed-through element or connecting element.

$T_{hsph}$—Hemispherical temperature which, as described previously, indicates the temperature at which the at least partially crystallizable or at least partially crystallized glass fuses to a metal, in particular fuses to an enclosure of a feed-through element or connecting element.

$T_{flow}$—Flow temperature at which flowing of the at least partially crystallizing glass arises and it begins to flow, for example when the tight and in particular hermetically tight contact is lost in a bond with a metal, which leads to an irreversible loss of sealing properties.

Table 1 below gives exemplary compositions of two examples of the second embodiment provided in accordance with the present disclosure. Example 1, which is also referred to as G1 in Tables 1 and 2, and Example 2, which is also referred to as Example G2 in Tables 1 and 2, and data relating to thermal properties thereof.

TABLE 1

| Oxides | G1 [wt %] | G2 [wt %] | 1st embodiment |
|---|---|---|---|
| $SiO_2$ | 40.8 | 45 | |
| $Al_2O_3$ | 12.7 | 11.3 | |
| MgO | 11.5 | 7.5 | |
| CaO | 10.5 | 18.8 | |
| $ZrO_2$ | 24.5 | 17.5 | |
| Thermal properties | | | |
| $T_{ST}$ | 966° C. | 975° C. | 854° C. |
| $T_{sph}$ | 1030° C. | 1040° C. | 898° C. |
| $T_{hsph}$ | 1248° C. | 1263° C. | 1117° C. |
| $T_{flow}$ | 1254° C. | 1267° C. | 1125° C. |

The third column in the above table discloses the thermal parameters of the first embodiment.

Examples 1 and 2

For producing the bond 12 between the at least partially crystallizable glass 2 and the metal of a connection, in particular the metal of an enclosure 4.1 of a feed-through element or connecting element 10, which is also referred to as glass sealing process, the temperature-time profile as described below was used here, in particular as a temperature-time program used to carry out the respective thermal treatment.

Temperature-Time Profile

A sintered body 1 obtained as described above, as a sintered preform, was introduced into the enclosure material 4 of a feed-through element or connecting element 10, and was heated together with the enclosure material from room temperature (RT) to a temperature of 1040° C., with about 10 K/min.

Figure 5:
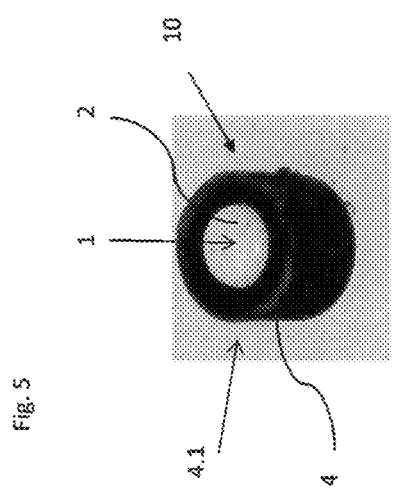
FIG. 5 is a photograph of a test configuration comprising a metal-comprising enclosure and a sintered body arranged therein, in particular as a sintered preform, after temperature treatment thereof, in which the molten sintered body comprises the at least partially crystallizable glass of the second embodiment and has been glass-sealed to the enclosure by the temperature treatment.

This feed-through element or connecting element can be seen in FIG. 5, by way of example, which is a photograph of a test configuration comprising a metal-comprising enclosure 4.1 and a sintered body 1 arranged therein in particular as a sintered preform, after temperature treatment thereof, in which the molten sintered body 1 comprises the at least partially crystallizable glass 2 of the second embodiment and has been fused to the enclosure 4.1 by the temperature treatment. For the present thermal measurements or tests, it is essentially irrelevant that the connecting element or feed-through element 10 shown in FIG. 5 does not comprise a functional element 5.

When a temperature of 1040° C. was reached, this temperature was maintained for 15 minutes to 60 minutes, which is the holding time of this glass-sealing process step.

Subsequently, the temperature was lowered from 1040° C. to room temperature (RT), with about 10 K/min. Here, room temperature refers to a temperature of about 20° C.

This temperature-time profile or program can also be employed in the same way in the methods for producing a bond and for producing a feed-through element and connecting element as described above and as in particular specified in the claims, in particular for producing a controlled porosity. However, it is useful in this case if those components to which the at least partially crystallizable or at least partially crystallized glass fuses and thus seals, are likewise subjected to the same temperature profile or at least a substantially identical temperature profile.

Verification of Temperature Resistance

Once the above temperature-time profile had been performed, the verification of temperature resistance, in particular verification of high-temperature resistance was carried out as follows.

The at least partially crystallizable or at least partially crystallized glass 2 was heated from room temperature, RT, to 1200° C., with a rate of temperature rise or heating rate of 10 K/min.

Then, a holding time of 10 minutes was maintained at 1200° C., and thereafter quenching back to room temperature, RT, was effected. The quenching occurred through cooling at room temperature, without additional cooling or heating measures.

The following results, as shown in Table 2, were obtained for the at least partially crystallizable glasses of the disclosure as described previously.

TABLE 2

| Examples | Mechanically stable seal | High-temperature resistance |
|---|---|---|
| G1 | ○ | ○ |
| G2 | ○ | ○ |

○—passed
X—failed

Thus, even after they had been tested for temperature resistance, the Examples 1 and 2 formed according to the disclosure still exhibit a mechanically stable seal and the desired high-temperature resistance.

Other glasses were examined which, however, did not exhibit the required properties. These glasses are Examples G3 through G6 of Table 3.

Counter-Examples

TABLE 3

| Oxides [wt %] | G3 [wt %] | G4 [wt %] | G5 [wt %] | G6 [wt %] |
|---|---|---|---|---|
| $SiO_2$ | 50.5 | 50.1 | 51.9 | 49.3 |
| $Al_2O_3$ | 9.3 | 9.2 | 13.0 | 9.1 |
| MgO | 21.3 | 21.1 | 3.0 | 20.7 |
| CaO | 13.9 | 13.9 | 21.6 | 13.7 |
| $ZrO_2$ | 2.7 | 2.6 | 7.0 | 2.6 |
| $B_2O_3$ | 2.3 | 3.0 | 3.5 | 4.6 |
| Thermal properties | | | | |
| $T_{ST}$ | 862° C. | 903° C. | 970° C. | 892° C. |
| $T_{sph}$ | X | X | 1033° C. | 930° C. |
| $T_{hsph}$ | 1249° C. | 1243° C. | 1145° C. | 1200° C. |
| $T_{flow}$ | 1260° C. | 1250° C. | 1200° C. | 1220° C. |

Temperature-Time Profile

A sintered body which was obtained as described above for the counter-examples G3 to G6 as well, as a sintered preform or shaped body, was introduced into the enclosure material of a feed-through element or connecting element, and was heated together with the enclosure material from room temperature (RT) to a temperature of 1040° C., with about 10 K/min.

When a temperature of 1040° C. was reached, this temperature was maintained for 15 minutes to 60 minutes, which represents the holding time of this process step.

Subsequently, the temperature was lowered from 1040° C. to room temperature (RT), with about 10 K/min. Here, room temperature refers to a temperature of about 20° C., which corresponded to cooling at room temperature without additional cooling or heating measures.

The verification of temperature resistance of the counter-examples G3 to G6 was also carried out as described above. More particularly, once the above temperature-time profile had been performed, the verification of high-temperature resistance was performed as follows.

The glass of counter-examples G3 to G6 was heated from room temperature, RT, to 1200° C., with a rate of temperature rise or heating rate of 10 K/min.

Then, a holding time of 7 minutes was maintained at 1200° C., and thereafter quenching back to room temperature, RT, was effected, which corresponded to a cooling under room temperature without additional cooling or heating measures.

The following results were obtained:

Examples G3 and G4 crystallized prior to wetting, so that no fusing or melting occurred, and so glass-sealing was not possible.

Although the Examples G5 and G6 wetted the metal, they did not meet the requirements of temperature resistance of up to more than 1200° C., rather the results shown in Table 4 were obtained.

TABLE 4

| Examples | Hermetic seal | High-temperature resistance |
|---|---|---|
| G3 | X | ○ |
| G4 | X | ○ |
| G5 | ○ | X |
| G6 | ○ | X |

○—passed
X—failed

Furthermore, the temperature-time profiles as described above were employed to two additional embodiments of the second embodiment of the at least partially crystallizable glasses, and subsequently performed the test for temperature resistance, in particular high-temperature resistance.

The first additional at least partially crystallizable glass was the glass of the third exemplary embodiment G7 and had the following composition, indicated in percent by weight of the oxides:

TABLE 5

| Oxides | wt % |
|---|---|
| $SiO_2$ | 50.9 |
| $Al_2O_3$ | 15.9 |
| CaO | 13.2 |
| MgO | 14.4 |
| $ZrO_2$ | 5.6 |

This third at least partially crystallizable glass G7 formed according to the second embodiment exhibited the following thermal properties:

TABLE 6

| Thermal properties | T [° C.] |
|---|---|
| Start of sintering | 800 |
| ST | 990 |
| $T_{sph}$ | 1050 |
| $T_{hsph}$ | 1260 |

Here, "Start of sintering" indicates the temperature at which sintering begins, and ST indicates the softening temperature.

The second additional at least partially crystallizable glass was the glass of the fourth exemplary embodiment G8 formed according to the second embodiment and had the following composition, indicated in percent by weight of the oxides:

TABLE 7

| Oxides | wt % |
|---|---|
| $SiO_2$ | 54 |
| $Al_2O_3$ | 13.5 |
| CaO | 22.5 |
| MgO | 3.0 |
| $ZrO_2$ | 7.0 |

The second additional at least partially crystallizable glass G8 exhibited the following thermal properties:

TABLE 8

| Thermal properties | T [° C.] |
|---|---|
| ST | 965 |
| $T_{sph}$ | 1030 |
| $T_{hsph}$ | 1230 |

For a better understanding, reference will now be made to FIG. 5, which shows a photograph obtained by the heating microscopy procedure known to those skilled in the art. As far as reference numerals are used in the following description of exemplary embodiments, the assemblies, components or features denoted by a respective reference numeral do not differ substantially from each other. Statements relating to the respective components are the same for all embodiments and their exemplary embodiments or versions, except for the respective different composition of the respective at least partially crystallizable or crystallized glasses and their properties.

The test configuration shown in FIG. 5 comprises a sintered body or sintered compact 1 and a metal-comprising enclosure 4.1, where the enclosure material 4 can be clearly seen.

The enclosure material 4 comprises a metal from the group of steels, for example standard steels, stainless steels, rustproof steels, and high-temperature stable ferritic steels, which are also known under the brand name Thermax, for example Thermax 4016, Thermax 4742, or Thermax 4762, or Crofer 22 APU or CroFer 22 H, or NiFe-based materials, e.g. NiFe45, NiFe47, or nickel plated pins, or known under the brand name Inconel, for example Inconel 718 or X-750, or steels such as known under the designations CF25, Alloy 600, Alloy 625, Alloy 690, SUS310S, SUS430, SUH446, or SUS316, or austenitic steels such as 1.4828 or 1.4841, or a high-temperature stable ceramic compound such as an alumina-based ceramic or a zirconia-based ceramic, for example a ceramic comprising Y-stabilized zirconia.

Inside the enclosure 4.1, a sintered body 1 is disposed which is also referred to as a sinter preform and which is shown after heat treatment thereof, in which the molten sintered body 1 comprising the at least partially crystallizable glass 2 of the embodiment G7 has been fused to the enclosure 4.1 by the heat treatment.

The temperature-time profile had been performed as described above for the at least partially crystallizable glass G7.

Here, the sintering process was carried out at 920° C. for a time period of 15 minutes.

The micrograph of FIG. 3 was obtained using a scanning electron microscope, which imaged the configuration shown in FIG. 3 after it had been severed across the center thereof, by sawing using a fine saw and subsequent polishing.

The embodiment shown in FIG. 4 passed the heat resistance test performed at 1200° C. for a time period of 15 minutes and did not show any cracking or mechanical damage even upon accelerated cooling, quenching.

Furthermore, a sintered body 1 which comprised the at least partially crystallizable glass 2 of the embodiment G8 and had been fused to the enclosure 4.1 due to the heat treatment was also tested inside the enclosure 4.1.

In this case, the sintering was carried out at 920° C. for a time period of 15 minutes.

The at least partially crystallizable glass 2 of embodiment G8 was treated similarly.

The embodiments G7 and G8 passed the heat resistance test conducted at 1200° C. for a time period of 15 minutes and did not show any cracking or mechanical damage even upon accelerated cooling, quenching.

As far as cracks should be discernable in the figures, these are a result of the sawing and hence of relieved mechanical stresses of the previously provided compression glass seal, but do not exist previously in the at least partially crystallized glass.

Figure 6:
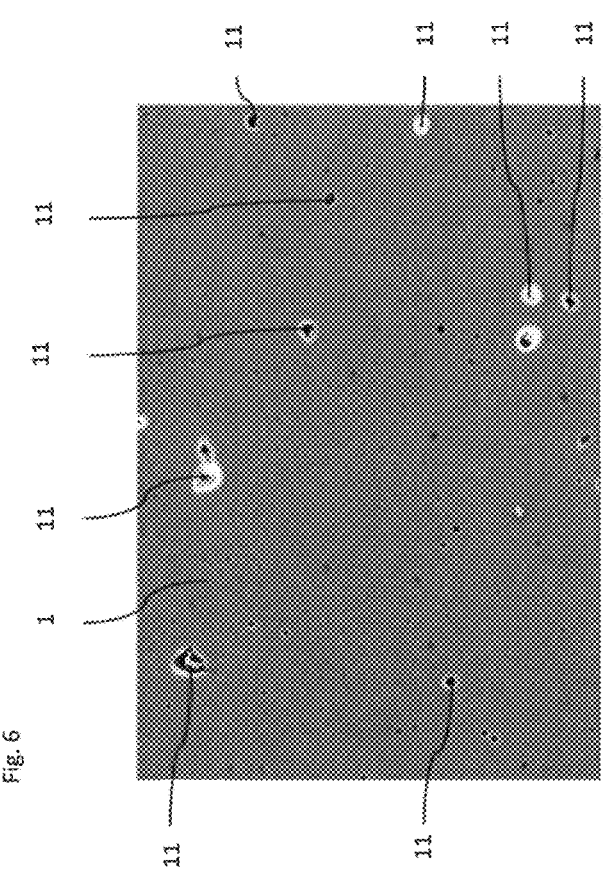
FIG. 6 is an electron micrograph of a cross-sectional view of a sintered body or sintered compact after sintering thereof, at about one thousand-fold magnification, showing the pores or defects that remained in the sintered body or sintered compact.

Reference is now made to FIG. 6, which shows an electron micrograph, at about one thousand-fold magnification, of a cross-sectional view of a sintered body or sintered compact 1 after sintering thereof, showing the pores 11 or defects 11 that remained in the sintered body or sintered compact 1, though, however, not all of them have been denoted by an own reference numeral.

Figure 7:
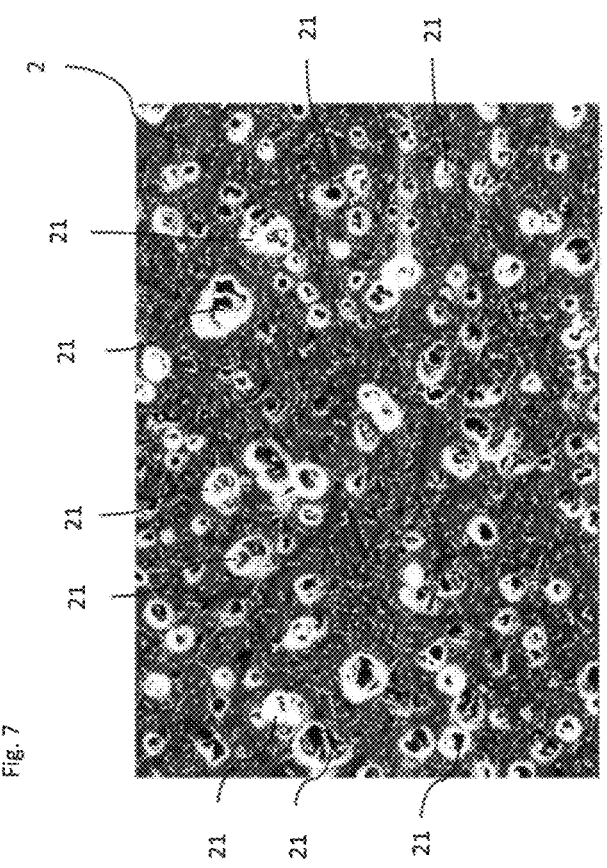
FIG. 7 is an electron micrograph of a cross-sectional view of the at least partially crystallizing glass that resulted from a sintered body or sintered compact similar to that shown in FIG. 6 by thermal treatment and in particular by at least partial crystallization, at about one thousand-fold magnification, in which the pores can be seen which formed in the sintered body or sintered compact simultaneously with crystallization.

FIG. 7 shows an electron micrograph, at about one thousand-fold magnification, of a cross-sectional view of the at least partially crystallizing glass 2 that resulted from a sintered body or sintered compact 1 similar to that shown in FIG. 6 by thermal treatment and in particular by at least partial crystallization, in which the pores 21 can be seen which formed in the sintered body or sintered compact 1 simultaneously with crystallization.

Such micrographs which can be produced in a plurality of sectional planes and for a plurality of sintered bodies or sintered compacts 1 can be used to determine a ratio between the pores 11 that were already created or existing in the sintered body, sintered compact or shaped body, and the pores 21 formed simultaneously with crystallization For example, for a sintering degree of about 99%, a ratio between the pores 11 that were already created or existing in the sintered body, sintered compact or shaped body 1, and the pores 21 formed simultaneously with crystallization was found to be about at least 1.8 or greater, and this ratio is adjustable in a wide range, through the maximum sintering temperature and the grinding process, in particular the degree of grinding of the ground glass, in particular green glass, and may for example range from at least 1.5 to about 5.

A high degree of sintering in particular ensures that the ratio mentioned above can be achieved in reproducibly manner.

Figure 8:
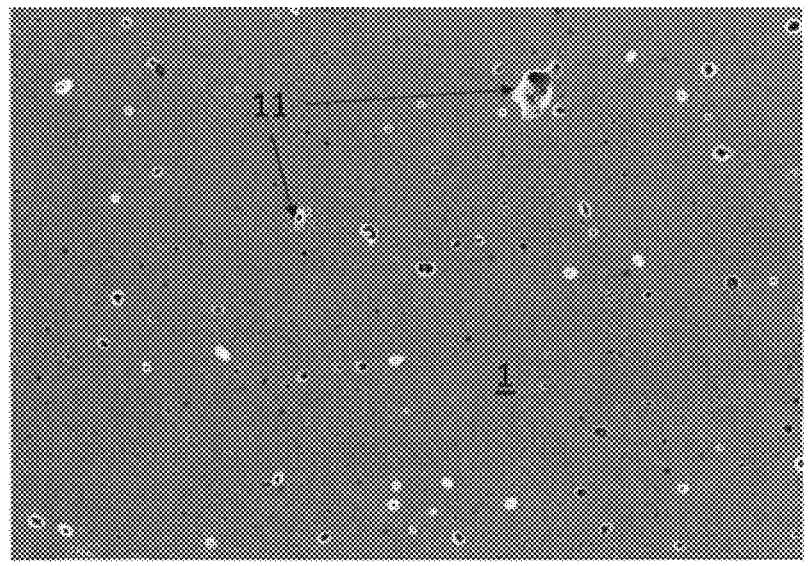
FIG. 8 shows an electron micrograph of a sintered body of an at least partially crystallizable glass.

FIG. 8 shows an electron micrograph of a sintered body or sintered compact 1 which was obtained by sintering an at least partially crystallizable glass of the first embodiment. The sintered compact has pores 11, these pores having different sizes and configurations. These are pores as resulting from the fabrication process of the sintered compact and as they are usually occur in sintered bodies. Although FIG. 8 and the subsequent FIGS. 9 to 12 relate to the at least partially crystallizing glass of the first embodiment, the facts disclosed by these figures and described herein are substantially also true for the further exemplary embodiments.

Figure 9:
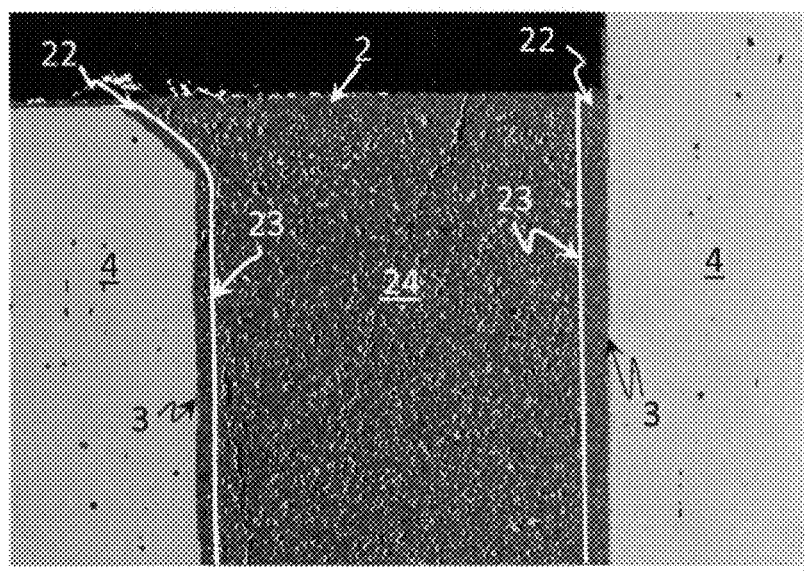
FIG. 9 shows an electron micrograph of an at least partially crystallized glass between two enclosure materials.

FIG. 9 illustrates, by way of example and in the form of an electron micrograph, an at least partially crystallized glass which is arranged between two enclosure materials 4, according to the method provided according to the present disclosure. Next to the interfaces 3 between the enclosure materials 4 and the at least partially crystallized glass 2 there is a region 22 which is already located in the partially crystallized glass 2 but has a very low porosity. By contrast, in the region 24 located further inside, porosity is significantly higher. By way of example, a boundary line can be assumed between regions 22 and 24, which indicates a boundary surface present in the sintered body or sintered compact 23 processed according to the method and which delimits the regions of different porosity from each other.

Figure 10:
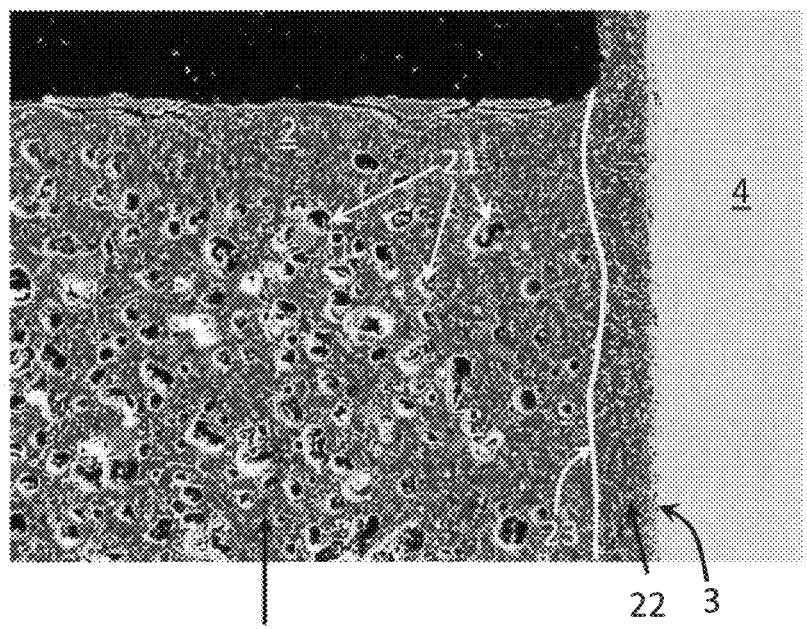
FIG. 10 is an enlarged view of the interface between at least partially crystallized glass and the enclosure material of an exemplary embodiment with the same material.

FIG. 10 shows a detail of an electron micrograph of an embodiment comprising the material shown in FIG. 9. The at least partially crystallized glass 2 has pores 21 in region 24, although for the sake of clarity not all pores have been denoted by a reference numeral. Furthermore, the boundary line 23 is indicated, which represents a boundary surface existing in the sintered body or sintered compact 23 processed according to the method and which delimits the region of low porosity 22 from the region of high porosity 24. This boundary line 23 is shown here merely as an example for clarifying the two different regions 22 and 24. Region 22 of the at least partially crystallized glass 2 is located adjacent to the interface 3 with the enclosure material 4. Compared to the pores shown in FIG. 8, it is clear that the vast majority of the pores shown in FIG. 10 were not already created or existing in the sintered body from which the at least partially crystallized glass resulted.

The at least partially crystallized glass 2 comprises crystallites which are shown here, inter alia, as light elongated components in a dark gray matrix, which partly comprises the so-called residual glass phase or glass phase.

Figure 11:
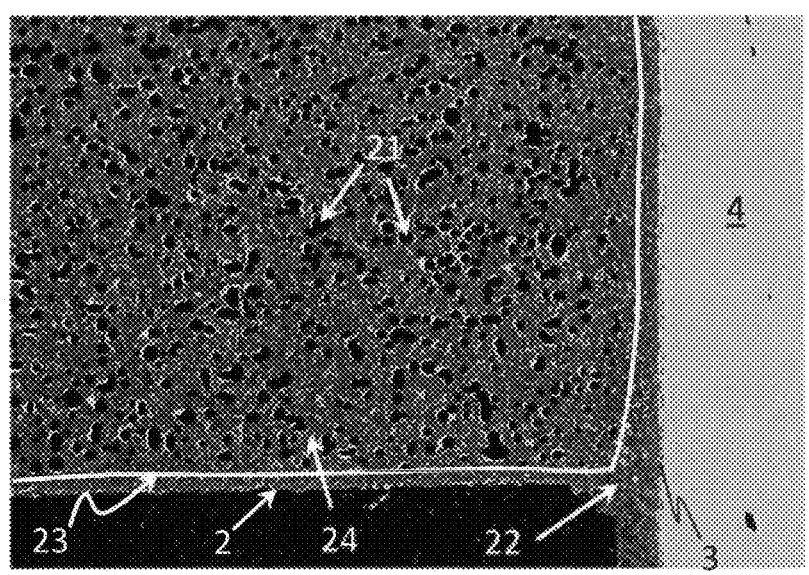
FIG. 11 is an electron micrograph of an at least partially crystallized glass at a first holding temperature.

FIG. 11 shows an electron micrograph of an at least partially crystallized glass 2 in contact with an enclosure material 4, for which the holding temperature was 940° C.±30° C., which temperature was applied over a time period of 30 minutes. The pores 21 were highlighted in black here, so that the porosity can be determined with an appropriate evaluation method. Here, the black pixels of the image were evaluated. For the sample illustrated in FIG. 11, the porosity Φ which was determined graphically in the central homogeneous region was found to be 20%. The boundary region 22 with low porosity has an extension of approximately 40 μm, and the gradient of porosity extends over a width of approximately 140 μm. Also, the interface 3 between the enclosure material 4 and the at least partially crystallized glass 2 is indicated, as well as the region 24 of elevated porosity. Also indicated is the boundary line 23 from which the region of low porosity 22 starts to extend towards the interface 3.

Figure 12:
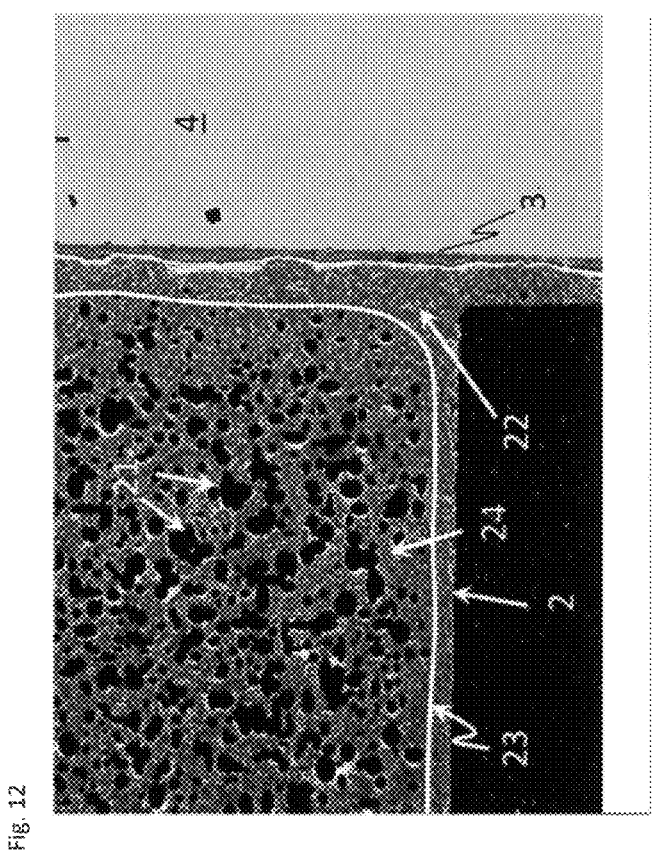
FIG. 12 is an electron micrograph of the at least partially crystallized glass of FIG. 11 at a second holding temperature.

FIG. 12 also shows an electron micrograph of an at least partially crystallized glass 2 which has the same starting composition as the at least partially crystallized glass of FIG. 11, in contact with an enclosure material 4. Here, again, the pores 21 were blackened for graphical evaluation. The holding temperature was higher by about 50° C., with the same holding time.

According to graphical evaluation, porosity Φ is about 38% in this example and thus almost doubled compared to the sample shown in FIG. 11. The mean pore size is also increased in significantly noticeable manner. Also, the region 22 of low porosity is more pronounced and now has a spatial extension of approximately 60 μm. However, the gradient within which the porosity increases from a low value to the maximum value, that is to say the transition to the region 24 of high porosity of the at least partially crystallized glass 2, is less pronounced and now has a width of approximately 100 μm, i.e., is reduced compared to the sample shown in FIG. 11. Again, the boundary line 23 is indicated here, from which the region of low porosity 23 starts to extend towards the interface 3. Interface 3 is indicated as well.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An at least partially crystallized glass, comprising:
at least one crystal phase; and
pores which are distributed in the at least partially crystallized glass in a structured manner, the at least partially crystallized glass comprising the following oxides, in wt %:

| | |
|---|---|
| SiO$_2$ | 20 to 60; |
| Al$_2$O$_3$ | 0.5 to 20; |
| CaO | 10 to 50; |
| MgO | 0.5 to 50; |
| Y$_2$O$_3$ | 0.1 to 20; |
| ZrO$_2$ | 0.1 to 25; and |
| B$_2$O$_3$ | 1 to 15. |

2. The at least partially crystallized glass of claim 1, wherein the pores of the at least partially crystallized glass were not already completely created or not already existing in a sintered body from which the at least partially crystallized glass resulted.

3. The at least partially crystallized glass of claim 2, wherein a majority of the pores formed simultaneously with crystallization.

4. The at least partially crystallized glass of claim 3, wherein the at least partially crystallized glass exhibits a ratio of pores that were already created or existing in the sintered body, a sintered compact or shaped body relative to the pores that formed simultaneously with crystallization of about 1.5 to 5 for a sintering degree of about 99%.

5. The at least partially crystallized glass of claim 1, comprising the following oxides, in wt %:

| | |
|---|---|
| SiO$_2$ | 36 to 54; |
| Al$_2$O$_3$ | 8 to 16; |
| CaO | 10 to 35; |
| MgO | 0.5 to 17; |
| RO | 8 to 39; |
| ZrO$_2$ | 0.1 to 25; and |
| B$_2$O$_3$ | 1 to 3; | wherein the amount of RO indicates the oxides BaO, SrO, MgO, ZnO, in total or in any mixture thereof.

6. The at least partially crystallized glass of claim 1, wherein the at least one crystal phase comprises a metal oxide including at least one of a medium-sized cation that has an ionic radius between 0.50 Å and 0.90 Å or a chain silicate.

7. The at least partially crystallized glass of claim 6, wherein the metal oxide comprises ZrO$_2$ and yttrium.

8. The at least partially crystallized glass of claim 6, wherein the at least one crystal phase is at least one of free of Y$_2$O$_3$ or free of ZrO$_2$.

9. The at least partially crystallized glass of claim 6, wherein the metal oxide is CaO and wherein the chain silicate further comprises yttrium.

10. The at least partially crystallized glass of claim 6, wherein the at least one crystal phase comprises at least one of a chain silicate comprising SiO$_3^{2-}$ as a silicate structural unit or a chain silicate comprising alkaline earth oxide.

11. The at least partially crystallized glass of claim 10, wherein the chain silicate is in the form of a chain silicate comprising alkaline earth oxide and having a pyroxene structure, and wherein the alkaline earth oxide comprises CaO and MgO.

12. The at least partially crystallized glass of claim 1, wherein the at least partially crystallized glass has a porosity that increases from a surface of the at least partially crystallized glass towards an interior thereof to a maximum value of at least 20%.

13. The at least partially crystallized glass of claim 12, wherein the porosity at least 3% by volume.

14. The at least partially crystallized glass of claim 1, wherein the pores are at least partially located in the vicinity of crystals.

15. The at least partially crystallized glass of claim 1, wherein the at least partially crystallized glass has a crystal content of at least 25% based on a total volume of the at least partially crystallized glass.

16. The at least partially crystallized glass of claim 15, wherein the crystal content is more than 60% based on the total volume.

17. The at least partially crystallized glass of claim 1, wherein the pores have a size between 2 μm and 30 μm.

18. The at least partially crystallized glass of claim 1, wherein the at least partially crystallized glass comprises crystallites having a size from 0.1 μm to 50 μm.

19. An at least partially crystallized glass, comprising:
at least one crystal phase; and
pores which are distributed in the at least partially crystallized glass in a structured manner, wherein the at least partially crystallized glass has a crystal content of at least 25% based on a total volume of the at least partially crystallized glass.

20. An at least partially crystallized glass, comprising:
at least one crystal phase; and
pores which are distributed in the at least partially crystallized glass in a structured manner, wherein the pores have a size between 2 μm and 30 μm.

* * * * *